United States Patent [19]

Megiddo et al.

[11] Patent Number: 5,953,531
[45] Date of Patent: Sep. 14, 1999

[54] METHOD OF, SYSTEM FOR, AND COMPUTER PROGRAM PRODUCT FOR MINIMIZING LOOP EXECUTION TIME BY OPTIMIZING BLOCK/TILE SIZES

[75] Inventors: Nimrod Megiddo, Palo Alto, Calif.; Vivek Sarkar, Newton, Mass.

[73] Assignee: International Business Machines Corporation, Armonk, N.Y.

[21] Appl. No.: 08/900,767

[22] Filed: Jul. 25, 1997

[51] Int. Cl.$^6$ ................................................ G06F 9/45
[52] U.S. Cl. .................... 395/709; 395/705; 395/707; 364/148
[58] Field of Search .................... 345/507; 395/701, 395/702, 706, 707, 709, 710, 705; 364/148, 152

[56] References Cited

U.S. PATENT DOCUMENTS

| | | | |
|---|---|---|---|
| 4,656,582 | 4/1987 | Chaitin et al. | 395/707 |
| 5,193,180 | 3/1993 | Hastings | 395/710 |
| 5,471,593 | 11/1995 | Branigin | 395/582 |
| 5,535,393 | 7/1996 | Reeve et al. | 395/706 |
| 5,659,753 | 8/1997 | Murphy et al. | 395/705 |
| 5,713,010 | 1/1998 | Buzbee et al. | 345/507 |

OTHER PUBLICATIONS

Waters, "Automatic transformation of series expressions into loops", ACM Trans. Lang. & Syst. vol. 13, No. 1, pp. 52–96, Jan. 1991.

Carr et al., "Compiler optimizations for improving data loacality", ASPLOS–ACM, pp. 252–262, Oct. 1994.

Carr et al., "Improving the ratio of memory operations to floating point operations in loops", ACM Trans. Prog. Lang. & Syst., vol. 16, No. 6, pp. 1768–1810, Nov. 1994.

Wei Li, Compiler cache optimizations for banded matrix problems, ICS 95, ACM, pp. 21–30, 1995.

Li et al., Exploiting cache affnity in software cache coherence, ICS 94, ACM, Jul. 1997, pp. 264–273, 1994.

Bhattacharya et al., Performance analysis and optimization of schedules for conditional and loop intensive specifications, DAC 94, Procedings of 31 st Annual Conf., Design Automation, pp. 491–496, 1994.

Ohta et al., Optimal tile size adjustment in compiling general DOACROSS loop nests., ICS 95, ACM Jun. 1995, pp. 270–279.

Debray, Saumya, Abstract interpretation and low level code optimization, PEPM 95, ACM, pp. 111–121, 1995.

Wang Ko, Precise compile time performance prediction for superscalar based computers, SIGPLAN 94, ACM Jun. 1994, pp. 73–84.

*Primary Examiner*—Tariq R. Hafiz
*Assistant Examiner*—Anil Khatri
*Attorney, Agent, or Firm*—Prentiss W. Johnson

[57] ABSTRACT

An optimized set of block sizes for a nest of loops for improved data locality is determined by estimating a memory cost per iteration as a function of the block sizes and selecting a set of block sizes that yield a minimum memory cost per iteration subject to a plurality of constraints. An objective function is an estimated memory cost per iteration as a function of the block sizes. An optimal solution is provided by evaluating the objective function for candidate points in the iteration space. These candidate points comprise: corner points of the iteration space, intersections between constraints and the edges of the iteration space, zero-derivative points for the curve that is the intersection of constraints with the objective function, intersection points between constraints, and local optimum of the objective function. Alternatively, an optimized set of block sizes for a nest of loops may be determined by iteratively searching the iteration space for the optimal solution. The advantages provided include improved compiler optimization, improved selection of loop tile sizes, improved execution time for selection of loop block sizes, improved data access locality, improved execution time of nested program loops, different optimal block sizes for each loop of a loop nest, optimal block sizes for a loop nest containing an array variable whose number of dimensions are different from the number of loops in the loop nest, and optimal block sizes for a loop nest containing non-uniformly generated data.

15 Claims, 9 Drawing Sheets

100

```
1]      parameter (n=400)
2]
3]      real*4 b(n,n), c(n,n)
4]      real*8 a(n,n)
5]
6]         do i = 1, n
7]            do k = 1, n
8]               a(j,i) = a(j,i) + dble(b(i,k)) * dble(c(k,j))
9]            end do
10]        end do
11]
12]     print *, a(1,1)
13]
14]     end
```

150

```
1]      parameter (n=400)
2]
3]      real*4 b(n,n), c(n,n)
4]      real*8 a(n,n)
5]
6]         do j = 1, n
7]            do i = 1, n
8]               do k = 1, n
9]                  a(j,i) = a(j,i) + dble(b(i,k)) * dble(c(k,j))
10]              end do
11]           end do
12]        end do
13]
14]     print *, a(1,1)
15]
16]     end
```

*Fig. 1*

METHOD OF, SYSTEM FOR, AND COMPUTER PROGRAM PRODUCT FOR MINIMIZING LOOP EXECUTION TIME BY OPTIMIZING BLOCK/TILE SIZES

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to software optimization that may be used by a programmer or an automatic program optimizer, and more particularly to a technique for loop blocking or loop tiling applied to a perfect nest of loops.

2. Description of the Related Art

Loop tiling or loop blocking is a well known program transformation used by programmers and program optimizers to improve the instruction-level parallelism, data access locality, and register locality and to decrease the branching overhead of a set of perfectly nested loops program loops. Many optimizing compilers employ the loop tiling transformation to some degree.

To block a given loop, a compiler replaces the original loop with two perfectly nested loop s, an outer control loop and an inner blocked loop, as shown in the following example:

| Original Loop | Perfectly Nested Loops | |
|---|---|---|
| do i = 1, n | do ii = 1, n, B | Control Loop |
| ... | do i = ii, min(i+B−1, n) | Blocked Loop |
| enddo | ... | |
| | enddo | |
| | enddo | |

In this example, B is the block size specifying the maximum number of iterations executed by the inner blocked loop.

Blocking a single loop, as shown above, does not in itself improve data locality, since the loop iterations are performed in exactly the same order as before. The real benefit of blocking is realized when it is combined with loop interchange. In the following example, a matrix transpose loop nest is transformed by first blocking both the j and i loops with block sizes $B_j$ and $B_i$ respectively, and then by interchanging loops j and ii so that the controls loops are moved outward and the blocked loops are moved inward.

| Original Loops | Loops After Blocking | Loops After Interchange |
|---|---|---|
| do j=1,n | do jj=1,n,$B_j$ | do jj=1,n,$B_j$ |
| do i=1,n | do j=jj,min(jj+$B_j$−1,n) | do ii=1,n,$B_i$ |
| A(i,j)=B(j,i) | do ii=1,n,$B_i$ | do j=jj,min(jj+$B_j$−1,n) |
| enddo | do i=ii,min(ii+$B_i$−1,n) | do i=ii,min(ii+$B_i$−−1,n) |
| enddo | A(i,j)=B(j,i) | A(ij)=B(j,i) |
| | enddo | enddo |
| | enddo | enddo |
| | enddo | enddo |
| | enddo | enddo |

Although the prior art defined the above blocking transformation, and recognized that the block sizes may affect program performance, the prior art has failed to provide a solution to the problem of determining optimized block/tile sizes for improved data locality.

For instance, Rajic et al. (Hrabri Rajic and Sanjiv Shah, "Maximum Performance Code Restructuring for Hierarchical Memory RISC Computers", SIAM Conference, Houston, Tex., March 1991.) teaches the loop blocking/tiling transformation and gives examples. Although, Rajic et al. teaches that the block sizes may be variables (iblock, jblock, kblock), Rajic et al. does not teach or suggest how to select the block size values.

Irigoin et al. (Francois Irigoin and Remi Triolet, "Supemode Partitioning", Conference Record of Fifteenth ACM Symposium on Principles of Programming Languages, 1988.) teaches supemode partitioning with multiple hyperplanes, which can be used to form general hyperparallelepiped tiles of the iteration space rather than just rectilinear tiles. Irigoin et al. also fails to teach or suggest how to select the block size values.

Similarly, Ramanujam et al. (J. Ramanujam and P. Sadayappan, "Compile-Time Techniques for Data Distribution in Distributed Memory Machines", IEEE Transactions on Parallel and Distributed Systems, 2(4) p. 472–482, October 1991.) teaches data partitioning in multicomputers with local memory, akin to the supernode partitioning introduced in Irigoin et al. Ramanujam et al.'s teachings produce communication-free hyperplane partitions for loops containing array references with affine index expressions, when communication-free partitions exist. However, Ramanujam et al.'s teachings also fail to teach or suggest a method for selecting block or tile sizes.

Schreiber et al. (Robert Schreiber and Jack J. Dongaffa, "Automatic Blocking of Nested Loops", Technical Report 90.38, RIACS, August 1990.) addresses the problem of deriving an optimized tiled (hyperparallelepiped) iteration space to minimize communication traffic. The teachings of Schreiber et al only address the restricted case in which all block sizes are assumed to be equal and the iteration and data spaces are isomorphic.

Abraham et al. (S. G. Abraham and D. E. Hudak, "Compile-Time Partitioning of Iterative Parallel Loops to Reduce Cache Coherency Traffic", IEEE Transactions on Parallel and Distributed Systems, 2(3), p. 318–328, July 1991.) teaches loop partitioning for multiprocessors with caches, and selecting tile sizes for parallelism rather than data locality. The teachings of Abraham et al. are limited by its assumptions that the number of loops in a nest match the number of dimensions in an array variable being processed, and that an array location being updated in a single iteration of the loops has the form $A[i_1,i_2, \ldots]$ for loop index variables $i_1, i_2, \ldots$.

As with the loop blocking prior art, the prior art of caching does not teach or suggest a method of determining optimized block/tile sizes for improved data locality.

Ferrante et al. (Jeanne Ferrante, Vivek Sarkar, and Wendy Thrash, "On Estimating and Enhancing Cache Effectiveness", Lecture Notes in Computer Science, p. 589, 1991, Proceedings of the Fourth International Workshop on Languages and Compilers for Parallel Computing, Santa Clara, Calif., USA, August 1991.) teaches how to efficiently estimate the number of distinct cache lines used by a given loop in a nest of loops. Ferrante et al. presents simulation results indicating that the estimates are reasonable for loop nests such as matrix multiply.

The problem of estimating the amount of local memory needed by array references contained within a nest of loops was considered in Gannon et al. (Dennis Gannon, William Jalby, and Kyle Gallivan, "Strategies for Cache and Local Memory Management by Global Program Transformations", Proceedings of the First ACM International Conference on Supercomputing, June 1987.) and Gallivan et al. (Kyle Gallivan, William Jalby, and Dennis Gannon, "On the Problem of Optimizing Data Transfers for Complex Memory Systems", Proc. of ACM 1988 Int'l. Conf. on Supercomputing, St. Malo, France, Jul. 4–8, 1988, pp.238–253, 1988.). They introduced the notion of uniformly generated data dependences and based their analysis for this class of dependences. Since many data dependences are not uniformly generated, it limits the applicability of their technique in practice. As evidence of this, in Shen et al. (Zhiyu Shen, Zhiyuan Li, and Pen-Chung Yew, "An Empirical Study on Array Subscripts and Data Dependences", Technical Report CSRD Rpt. No. 840, University of Illinois-CSRD, May 1989.), in a sample of Fortran programs (including library packages such as Linpack and Eispack and numeric programs such as SPICE) 86% of dependences found had non-constant distance vectors. Gannon et al. and Gallivan et al. focused on optimizing for a software-controlled local memory (as in a distributed-memory multiprocessor), rather than for a hardware-controlled cache memory. Therefore, factors like cache line size, set associativity and cache size were not taken into account.

The problem of estimating the number of cache lines for uniprocessor machines was considered by Porterfield (Allan K. Porterfield, "Software Methods for Improvement of Cache Performance on Supercomputer Applications", PhD Thesis, Rice University, May 1989, Rice COMP TR89-93). However, Porterfield's technique assumes a cache line size of one element, and many machines have a cache line size greater than one. Further, the analysis in Porterfield only applies to the special case of data dependences with constant direction vectors, which is not the usual case in practice, Shen et al. The approach in Porterfield is based on computing all cache dependences of a program (similar to data dependences); therefore, the number of dependence tests performed may be quadratic in the number of array references.

Wolf et al. (Michael E. Wolf and Monica S. Lam., "A Data Locality Optimization Algorithm", Proceedings of the ACM SIGPLAN Symposium on Programming Language Design and Implementation, June 1991.), teaches a cache cost model based on a number of loops carrying reuse. Such reuse may either be temporal (relating to the same data item) or spatial (relating to data items in the same cache line), and is given for both single and multiple references.

Related work in summarizing array dependence information for interprocedural analysis can be found in Balasundaram (Vasanth Balasundaram, "A Mechanism for Keeping Useful Internal Information in Parallel Programming Tools: The Data Access Descriptor", Journal of Parallel and Distributed Computing}, 9, p. 154–170, 1990.) While less costly than full dependence analysis, such summaries are usually more costly and precise than needed for cache analysis.

Thus, despite extensive effort in the compiler art related to loop blocking/tiling and cache data locality, the prior art has failed to provide a solution to the problem of determining optimized block/tile sizes for improved data locality. Accordingly, there is a clearly felt need in the art for a method of, system for, and computer program product for, providing optimized block/tile sizes for improved data locality.

SUMMARY OF THE INVENTION

The invention disclosed herein comprises a method of, a system for, and an article of manufacture for providing optimized block/tile sizes for improved data locality.

In accordance with one aspect of this invention, an optimized set of block sizes for a nest of loops is determined by estimating a memory cost per iteration as a function of the block sizes and selecting a set of block sizes that yield a minimum memory cost per iteration subject to a plurality of constraints.

In accordance with another aspect of this invention, the memory cost per iteration is estimated proportional to a ratio of a memory cost over a product of block sizes.

In accordance with another aspect of this invention, the memory cost is estimated proportional to a sum of two products, a first product of an estimated overhead for fetching a new line in cache and an estimated number of cache lines accessed, and a second product of an estimated overhead for fetching a new page in a translation look-aside buffer and an estimated number of pages accessed.

In accordance with another aspect of this invention, a minimum memory cost per iteration is determined by evaluating partial derivatives of the above estimated memory cost.

In accordance with another aspect of this invention, a minimum memory cost per iteration is determined by evaluating the estimated memory cost at candidate points in an iteration space, wherein these candidate points comprise: corner points of the iteration space, intersections between constraints and the edges of the iteration space, zero-derivative points for the curve that is the intersection of constraints with the objective function, intersection points between constraints, and local optimum of the estimated memory cost.

In accordance with another aspect of this invention, a minimum memory cost per iteration is selected subject to a plurality of constraints.

In accordance with another aspect of this invention, the plurality of constraints comprise a maximum block size, $bmax_i$; a maximum effective cache size, ECS; and a maximum effective translation look-aside buffer size, ETS.

In accordance with another aspect of this invention, one of the computed candidate points is selected as an optimized solution.

The present invention has the advantage of providing improved compiler optimization.

The present invention has the further advantage of providing improved selection of loop tile sizes.

The present invention has the further advantage of providing improved execution time for selection of loop block sizes.

The present invention has the further advantage of providing improved data access locality.

The present invention has the further advantage of providing improved execution time of nested program loops.

The present invention has the further advantage of providing different optimal block sizes for each loop of a loop nest.

The present invention has the further advantage of providing optimal block sizes for a loop nest containing an array variable whose number of dimensions are different from the number of loops in the loop nest.

The present invention has the further advantage of providing optimal block sizes for a loop nest containing non-uniformly generated data dependencies.

BRIEF DESCRIPTION OF THE DRAWINGS

For a more complete understanding of the present invention and the advantages thereof, reference is now made to the Detailed Description in conjunction with the attached Drawings, in which:

FIG. 1 shows sample code loop upon which loop blocking is to be performed in accordance with the present invention;

DESCRIPTION OF THE PREFERRED EMBODIMENT

Figure 2:
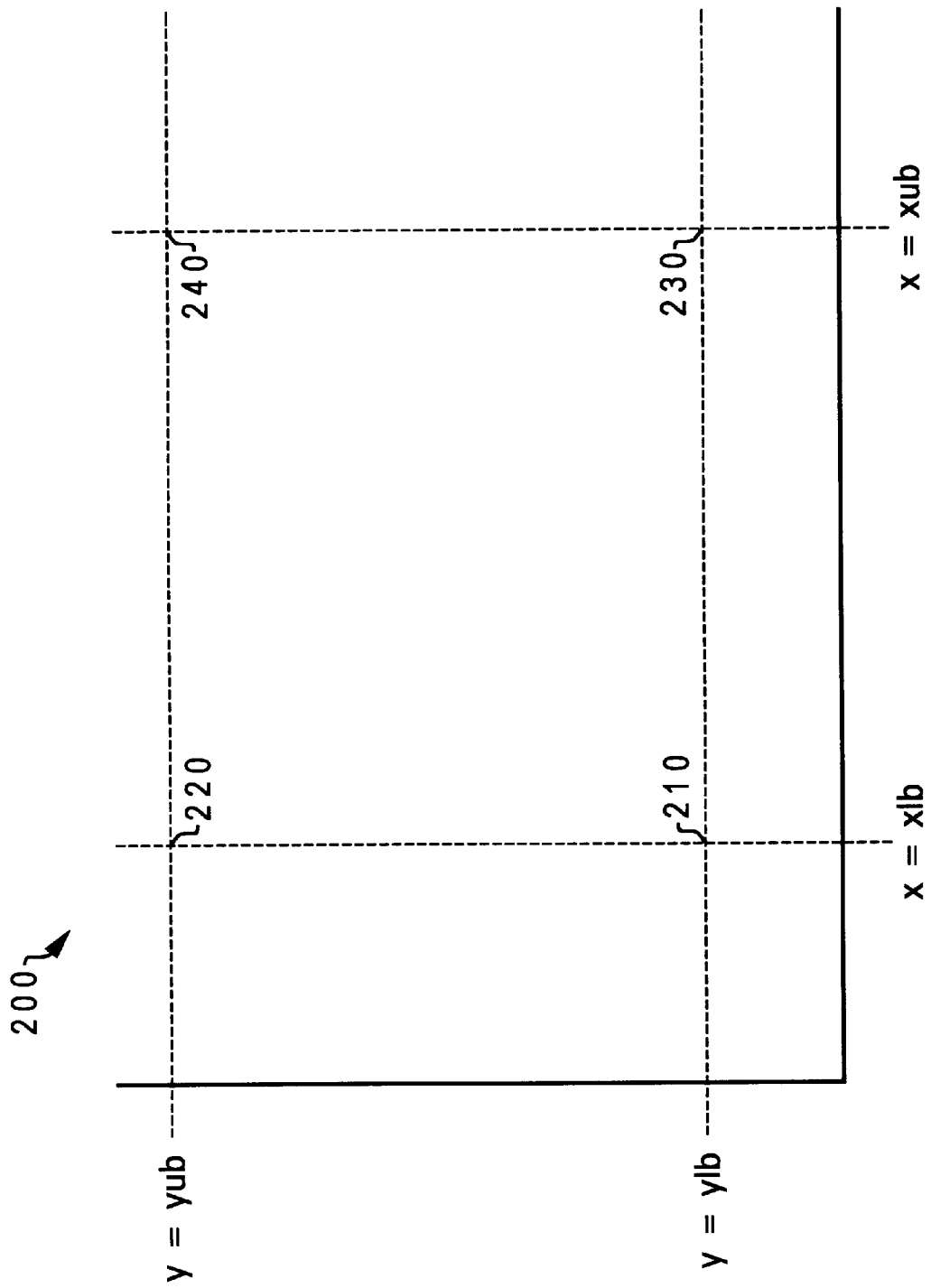
FIG. 2 is pictorial representation of a loop iteration space corresponding to the sample loop of FIG. 1.

The invention disclosed herein comprises a method of, a system for, and an article of manufacture for providing optimized block/tile sizes for improved data locality. An optimized set of block sizes for a nest of loops is determined by estimating a memory cost per iteration as a function of the block sizes and selecting a set of block sizes that yield a minimum memory cost per iteration subject to a plurality of constraints. Given a loop nest, the present invention performs the following:

1. Estimates the memory cost per iteration (including both cache misses and TLB misses) of the loop nest as a function of block sizes of the loops in the locality group;
2. determines memory costs of loop ordering permutations and selects an optimal loop ordering permutation; and
3. Computes an optimized set of block sizes, those loop block sizes with a minimum memory cost for the selected loop ordering permutation.

Estimating the Memory Cost per Iteration

In a preferred embodiment of the present invention, the total memory cost for the iteration block is estimated as follows:

$$COST_{total} = (\text{overhead for fetching a new line in cache}) * DL_{total} + (\text{overhead for fetching a new page in TLB}) * DP_{total},$$

where $DL_{total}$ is an estimate of the total number of cache lines accessed by a single iteration of the loop nest, and where $DP_{total}$ is an estimate of the total number of pages accessed by a single iteration of the loop nest. See the section below titled "Estimating the Memory Cost" for additional details on the estimation of memory costs in this preferred embodiment. Of course, those skilled in the art recognize that the above total memory cost estimate may be extended to other memory hierarchies, and that the practice of the present invention may be applied to other memory hierarchies.

The objective of the present invention is to minimize the memory cost per iteration which is defined by the ratio $COST_{total}/(B_0^* \ldots * B_{m-1})$ where $B_0 \ldots B_{m-1}$ are the block sizes for loops $0 \ldots m-1$, respectively.

Array Coefficients List

To facilitate computing the memory cost for the entire loop nest, a temporary Array Coefficients List is built for each array variable that has a reference in the loop nest (the temporary list is allocated and freed in turn for each array variable). The Array Coefficients List is a generic linked list of ArrayCoeffsNode structures. Function UpdateArrayCoeffsList(N, ACL) inserts an entry corresponding to an array reference node N into list ACL if the following two conditions are satisfied:

1. The array reference node N has an analyzable subscript table.

Non-analyzable array references are ignored because (according to this model) their memory cost does not depend on the loop configuration selected or on the block size values chosen, and hence they do not affect the relative value of memory costs. All the decisions made by the Selection of Locality phase need only relative memory costs.

However, if there is a need to estimate absolute memory costs, then a worst-case contribution of one cache miss and one TLB miss per iteration may be assumed and added into the memory cost function, for each non-analyzable array reference.

2. The array reference corresponding to N is not equivalent to any other entry in ACL.

This condition implements the simple model that all equivalent array references have 100% overlap, and all non-equivalent array references have zero overlap.

Note that checking for an equivalent entry in ACL has a worst-case complexity that is quadratic in the number of references to the same array variable in the given loop nest. Since data dependence testing also needs to examine a quadratic number of array reference pairs in the worst-case, this computation is not a bottleneck. However, this check may be preformed more efficiently by using hashing to determine more quickly if an equivalent array reference is present in ACL.

Computing $DL_{total}$ and $DP_{total}$

Given a list of array references in MergedArrayRefsList, and a loop nest of interest defined by perfect loop nest LoopArray[0 . . . NumLoops−1], inverse transformation matrix inv_M, and bit vector LoopSet, function Compute_DL_DP( ) returns the following:

DLout=polynomial expression for number of distinct cache lines accessed by the array references (as a function of block sizes)

DPout=polynomial expression for number of distinct virtual pages accessed by the array references (as a function of block sizes)

Bmax=array of upper bounds on block sizes

The function Compute_DL_DP( ) operates as follows:

---

Initialize DL and DP to an empty tree (i.e. a polynomial with no terms)
FOR EACH array variable Var IN MergedArrayRefsList DO
  FOR EACH entry ACLNode in ACL for Var DO
    Compute DL_term for ACLNode & update DL
    Compute DP_term for ACLNode & update DP
  END FOR
END FOR

---

Determining Memory Costs of Loop Ordering Permutations and Selecting an Optimized Loop Ordering Permutation Given polynomial expressions for DL and DP, a simple and efficient method is used to choose a loop ordering that is optimized for locality:

1. Examine $(B_0, \ldots b_{m-1})=(1 \ldots, 1)$ as an initial solution. If it does not satisfy the cache and TLB size constraints, then each iteration will overflow the cache or TLB, so no loop restructuring is performed.
2. Otherwise, evaluate the k partial derivatives of function $$F = COST_{total}/(B_0 * \ldots * B_{m-1}),$$
$$F_i(B_0, \ldots, B_{m-1}) = \text{delta F/delta Bi at } (B_0, \ldots, b_{m-1}) = (1, \ldots, 1).$$

3. Return a suggested loop ordering in decreasing order of the partial derivative (slope) values. The loop with the most negative slope should be placed in the innermost position since it is likely to yield the largest reduction in memory cost, and so on for the other loops. Note that this suggested loop ordering is based purely on memory costs. It is left to the caller to determine how close the loop configuration can be made to approach this ideal loop ordering, according to the data dependence constraints.

Problem Statement for Optimized Selection of Block Sizes

The problem statement may be formulated as a constrained optimization problem:

The objective function to be minimized is:
$F(B_0, \ldots, B_{m-1}) = COST_{total}/(B_0^* \ldots * Bm_{m-1})$, the average cache and
TLB miss overhead per iteration of the blocked loop.

The constraints to be satisfied by the solution are
Each $B_i$ must be integer-valued and must be in the range, $1 \leq B_i \leq bmax_i$. A default value like 1000 or 10000 is used for $bmax_i$, if the number of loop iterations is unknown at compile-time.
$DL(B_0, \ldots, B_{m-1}) \leq ECS$, the number of distinct cache lines accessed must not exceed the effective cache size.
$DP(B_0, \ldots, B_{m-1}) \leq ETS$, the number of distinct virtual pages accessed must not exceed the effective TLB size.

Method of the Preferred Embodiment of the Present Invention

The inventors have discovered that the minimization of the above objective function $F(B_0, \ldots, B_{m-1}) = COST_{total}/(B_0^* \ldots * B_{m-1})$ may be reformulated for the m=2 case as:

$$\Phi(x,y) = A/x + B/y + C/xy$$

subject to the constraints of:
$axy+bx+cy+d \geq 0$;
$0 < xlb \leq x \leq xub$, where xlb is a lower bound of x and xub is an upper bound of x; and
$0 < ylb \leq y \leq yub$, where ylb is a lower bound of y and yub is an upper bound of y.

Figure 3:
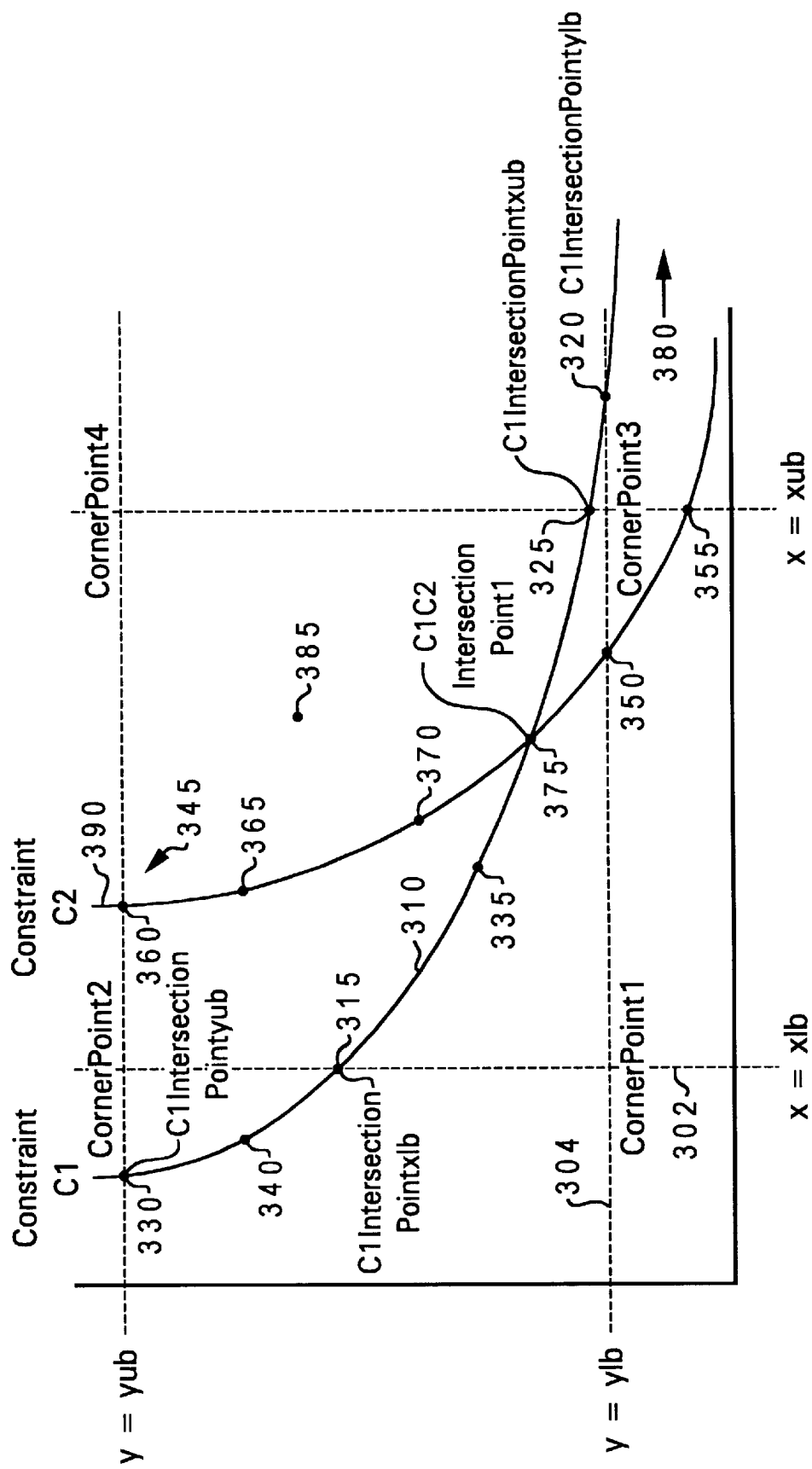
FIG. 3 is a representation of the loop iteration space corresponding to the sample loop of FIG. 1 illustrating the practice of the present invention.

The inventors have further discovered that the minimum of the objective function or the optimal solution is one of a set of candidate points in the iteration space. This set of candidate points comprises: corner points of the iteration space, intersections between constraints and the edges of the iteration space, zero-derivative points for the curve that is the intersection of constraints with the objective function, intersection points between constraints, and local optimum of the objective function. More specifically, for the m=2 case, there are nineteen candidate points, each of which can be computed in constant time without the need for any iterative solution technique, comprising:

corner points of the iteration space (200 of FIG. 2):
1. CornerPoint1 210=(xlb,ylb);
2. CornerPoint2 220=(xlb,yub);
3. CornerPoint3 230=(xub,ylb); and
4. CornerPoint4 240=(xub,yub);

candidate points due to constraint C1 310 of FIG. 3:
5. C1IntersectionPointxlb 315=intersection of x=xlb line 302 with constraint C1 310, if intersection exists;
6. C1IntersectionPointylb 320=intersection of y=ylb line 304 with constraint C1310, if intersection exists;
7. C1IntersectionPointxub 325=intersection of x=xub line 306 with constraint C1 310, if intersection exists;
8. C1IntersectionPointyub 330=intersection of y=yub line 308 with constraint C1 310, if intersection exists;
9. C1DerivativePoint1 335=a first zero-derivative point for the curve that is the intersection of constraint C1 310 with the objective function (This point is obtained from solutions to the one-variable quadratic equation obtained by substituting constraint C1 310 into the objective function to be minimized.); and
10. C1DerivativePoint2 340=a second zero-derivative point for the curve that is the intersection of constraint C1 310 with the objective function (This point is obtained from solutions to the one-variable quadratic equation obtained by substituting constraint C1 310 into the objective function to be minimized.);

candidate points due to constraint C2 390:
11. C2IntersectionPointxlb 345=intersection of x=xlb line 302 with constraint C2 390, if intersection exists;
12. C2IntersectionPointylb 350=intersection of y=ylb line 304 with constraint C2 390, if intersection exists;
13. C2IntersectionPointxub 355=intersection of x=xub line 306 with constraint C2 390, if intersection exists;
14. C2IntersectionPointyub 360=intersection of y=yub line 308 with constraint C2 390, if intersection exists;
15. C2DerivativePoint1 365=a first zero-derivative point for the curve that is the intersection of constraint C2 390 with the objective function (This point is obtained from solutions to the one-variable quadratic equation obtained by substituting constraint C2 390 into the objective function to be minimized.); and
16. C2DerivativePoint2 370=a second zero-derivative point for the curve that is the intersection of constraint C2 390 with the objective function (This point is obtained from solutions to the one-variable quadratic equation obtained by substituting constraint C2 390 into the objective function to be minimized.);

intersection points between constraints C1 310 and C2 390:
17. C1C2IntersectionPoint1 375=a first intersection point between constraints C1 310 and C2 390 (obtained from a solution to the one-variable quadratic equation obtained by equating constraints C1 310 and C2 390); and
18. C1C2IntersectionPoint2 380=a second intersection point between constraints $C_1$ 310 and C2 390 (obtained from a solution to the one-variable quadratic equation obtained by equating constraints C1 310 and C2 390); and 19. local optimum 385 of the objective function, if it exists.

The inventors have further discovered that the above method of evaluating this set of candidate points to determine the optimal solution may be extended to m>2 cases, e.g., for m=3, one may minimize over x, y, and z the value of:

$$A/x+B/y+C/z+D/xy+E/xz+F/yz+G/xyz$$

subject to the constraints of:

$$axyz+bxy+cxz+dyz+ex+fy+gz+h \geq 0;$$

$0 < xlb \leq x \leq xub$, where xlb is a lower bound of x and xub is an upper bound of x;

$0 < ylb \leq y \leq yub$, where ylb is a lower bound of y and yub is an upper bound of y; and $0 < zlb \leq z \leq zub$, where zlb is a lower bound of z and zub is an upper bound of z.

However, some iterative solution technique may be necessary in general to obtain solutions for the m>2 cases.

EXAMPLE FOR m=2

The present invention may be better understood by referring to the sample code of Table A (also shown as 100 of FIG. 1) which comprises two nested loops, m=2. The block sizes of the sample code of Table A are to be optimized for execution on a machine having the machine dependent characteristics of Table B.

TABLE A

Sample Code for m = 2 Case, Two Nested Loops

```
 1]    parameter (n=400)
 2]
 3]    real*4 b(n,n), c(n,n)
 4]    real*8 a(n,n)
 5]
 6]    do i=1, n
 7]      do k=1, n
 8]        a(j,i) = a(j,i) + dble(b(i,k)) * dble(c(k,j))
 9]      end do
10]    end do
11]
12]    print*, a(1,1)
13]
14]    end
```

TABLE B

Machine Dependent Information arch_arm: ARCH_COMMON
tune_arm: TUNE_RIOS1
CPU pipeline information:
  number of fixed-point units 1
  number of fixed-point stages 1
  number of floating-point units 1
  number of floating-point stages 2
architected CPU registers:
  number of fixed-point regs 29
  number of floating-point regs 32
instruction latency costs:
  divide_cost 19.000000
  store_cost 1.000000
  load_cost 0.500000
  branch_loop_cost 3.000000
  array_loop_cost 2.000000
memory hierarchy parameters:
  data_mem_arm[CACHE] .block_size 128

TABLE B-continued

Machine Dependent Information data_mem_arm[CACHE] .num_sets 128
data_mem_arm[CACHE] .assoc 4
data_mem_arm[CACHE] .miss_cost 15
inst_mem_arm[CACHE] .block_size 64
inst_mem_arm[CACHE] .num_sets 256
inst_mem_arm[CACHE] .assoc 2
inst_mem_arm[CACHE] .miss_cost 15
data_mem_arm[TLB] .block_size 4096
data_mem_arm[TLB] .num_sets 64
data_mem_arm[TLB] .assoc 2
data_mem_arm[TLB] .miss_cost 50
inst_mem_arm[TLB] .block_size 4096
inst_mem_arm[TLB] .num_sets 64
inst_mem_arm[TLB] .assoc 2
inst_mem_arm[TLB] .miss_cost 50

First, polynomial expressions for DL or $DL_{total}$ (number of distinct cache lines accessed) and DP or $DP_{total}$ (number of distinct virtual pages accessed) are computed for the sample code of Table A based upon the sample code of Table A and the machine dependent information of Table B to yield the polynomial expressions for DL and DP of Table C using the Compute_DL_DP procedure.

TABLE C

Polynomial Expressions for DL (Number of Distinct Cache Lines Accessed) and DP (Number of Distinct Virtual Pages Accessed) for Sample Code of Table A Compute_DL_DP: Bmax[0] = 400
Compute_DL_DP: Bmax[1] = 400
NEW DL[x_] := ((+1.000000)*(+1.000000*value[x,0])) +
((+0.031250*value[x,1]+0.968750)*(+1.000000)) +
((+0.031250*value[x,0]+0.968750)*(+1.000000*value[x,1]))
NEW DP[x_] := (+0.781250*value[x,0]+0.218750) +
(+0.000977*value[x,1]+0.999023) +
(+0.000977*value[x,0]+0.390625*value[x,1]+0.608398)
NEW cacheEfficiencyFactor = 1.000000 ; tlbEfficiencyFactor = 1.000000

Next, the present invention minimizes the function:

$$f=(Ax+By+Cxy+D)/(xy)$$

subject to the following constraints:

$$a1x+b1y+c1xy \leq k1$$

$$a2x+b2y+c2xy \leq k2$$

$$xlb \leq x \leq xub$$

$$ylb \leq y \leq yub.$$

For the sample code of Table A, the values of A, B, C, D, a1, b1, c1, k1, a2, b2, c2, k2, xlb, xub, ylb, and yub are shown in Table D and yield the function to be minimized:

$$f=(54.111328x+34.580078y+0.468750xy+105.839844)/(xy)$$

subject to the following constraints:

$$1.000000x+1.000000y+0.031250xy \leq 511.031250$$

$$0.782227x+0.391602y+0.000000xy \leq 126.173828$$

$1.000000 \leq x \leq 400.000000$
$1.000000 \leq y \leq 400.000000$

TABLE D

Constants and Constraints of Objective Function to be
Minimized for the m=2 Case
Sample Code of Table A Minimize the function:
  f = (Ax + By + Cxy + D) / (xy)
  subject to the following constraints:
  a1x + b1y + c1xy $\leq$ k1
  a2x + b2y + c2xy $\leq$ k2
  x1b $\leq$ x $\leq$ xub
  y1b $\leq$ y $\leq$ yub
  double A = 54.111328
  double B = 34.580078
  double C = 0.468750
  double D = 105.839844
  double a1 = 1.000000
  double b1 = 1.000000
  double c1 = 0.031250
  double k1 = 511.031250
  double a2 = 0.782227
  double b2 = 0.391602
  double c2 = 0.000000
  double k2 = 126.173828
  double x1b = 1.000000
  double xub = 400.000000
  double y1b = 1.000000
  double yub = 400.000000
  double *xans = 83.127496
  double *yans = 118.937009

Next, the candidate points are computed based upon the constants, constraints, and objective function of Table D yielding the nineteen candidate points for the m=2 case of Table E.

TABLE E

Nineteen Local Optimal Points for the m=2 Case Sample Code of Table A

| | | |
|---|---|---|
| CornerPoint1 = | Points[0] = | (1.000000,1.00000) |
| CornerPoint2 = | Points[1] = | (1.000000,400.000000) |
| CornerPoint3 = | Points[2] = | (400.000000,1.000000) |
| CornerPoint4 = | Points[3] = | (400.000000,400.000000) |
| C1IntersectionPointx1b = | Points[4] = | (1.000000,1.000000) |
| C1IntersectionPointxub = | Points[5] = | (400.000000,8.224537) |
| C1IntersectionPointy1b = | Points[6] = | (1.000000,1.000000) |
| C1IntersectionPointyub = | Points[7] = | (8.224537,400.000000) |
| C1DerivativePoint1 = | Points[8] = | (83.127496,118.937009) |
| C1DerivativePoint2 = | Points[9] = | (1.000000,1.000000) |
| C2IntersectionPointx1b = | Points[10] = | (1.000000,320.201995) |
| C2IntersectionPointxub = | Points[11] = | (1.000000,1.000000) |
| C2IntersectionPointy1b = | Points[12] = | (160.800250,1.000000) |
| C2IntersectionPointyub = | Points[13] = | (1.000000,1.000000) |
| C2DerivativePoint1 = | Points[14] = | (85.514504,151.383747) |
| C2DerivativePoint2 = | Points[15] = | (1.000000,1.000000) |
| C1C2IntersectionPoint1 = | Points[16] = | (120.141551,82.216004) |
| C1C2IntersectionPoint2 = | Points[17] = | (25.179298,271.903697) |
| LocalOptimalPoint = | Points[18] = | (1.000000,1.000000) |

Next, the objective function is evaluated for each of the candidate points of Table E so that an optimal solution with the smallest value of the objective function may be selected. A more efficient evaluation may be performed by filtering out duplicates among the candidate points so that the objective function is only computed for distinct points. For the sample code of Table A, candidate point C1DerivativePoint1 whose value is (83.127496,118.937009) yields the smallest value of the objective function. The memory costs of the two possible loop ordering permutations are also determined, and an optimal loop ordering permutation is selected as shown in Table F. Finally, an optimized set of block sizes comprising Bout[0]=83 and Bout[1]=118 with a minimum total memory cost of 1.354755 cycles per iteration is computed for the selected loop ordering permutation which is a significant reduction from the original memory cost of 35.548676 cycles per iteration, as shown in Table F.

TABLE F

Block Sizes and Memory Cost for the m=2 Case Sample Code of Table A

Call to EstimateMemCostOfPermutation:
  LoopSort[0] = 0
  LoopSort[1] = 1
  MemCost = 35.548676 cycles per iteration
  localityGroupSize = 0
Call to EstimateMemCostOfPermutation:
  LoopSort[0] = 0
  LoopSort[1] = 1
  MemCost = 35.548676 cycles per iteration
  localityGroupSize = 0
SelectBlockSizes() -- Loop permutation is unnecessary:
  act_MemCost = 35.548676 cycles per iteration
  p_MemCost = 35.548676 cycles per iteration
OUTPUT FROM call to SelectBlockSizes:
  Bout[0] = 83
  Bout[1] = 118
  MemCost = 1.354755 cycles per iteration

Method of an Alternative Embodiment of the Present Invention

An alternative embodiment of the present invention determines an optimized set of block sizes for a nest of loops by iteratively searching the iteration space for the optimal solution. In this alternative embodiment, the problem statement may be solved by the following method:

1. Compute symbolically the k partial derivatives of
  $F = COST_{total}/(B_0^* \ldots * B_{m-1})$,
  $F_i(B_0, \ldots, B_{m-1})$ = delta F/delta $B_i$.
2. Start with $(B_0, \ldots, b_{m-1}) = (1, \ldots, 1)$ as the initial solution. If it does not satisfy the cache and TLB size constraints, then return $(1, \ldots, 1)$ as the final solution.
3. Compute $F_i(B_0, \ldots, B_{m-1})$ for each i. If all $F_i$'s are greater than or equal to zero, then go to step 6. Otherwise, perform step 4 for each i in increasing order of $F_i$ (i.e. steepest descent first) until an i is found for which the new $B_i$ is distinct from the old $B_i$.
4. Compute the new $B_i$ using Newton's method, $$\text{new } B_i = B_i - \frac{F(B_0, \ldots, B_{m-1})}{F_i(B_1, \ldots, B_{m-1})}$$

If the new $B_i$ violates a cache or TLB size constraint, then repeatedly try midpoints between the old $B_i$ and the new $B_i$ until the constraints are satisfied, or until the new and old values of $B_i$ are the same. To avoid too much backtracking, a limit is imposed on the increment for (new $B_i - B_i$). In the example of Table G through Table U, this limit ensures that $B_i \leq B_i + 10$.
5. Update $B_i$ with new value, and go to step 3.
6. Return $(ib_l, \ldots, ib_k)$, the best integer solution in the neighborhood of $(B_l, \ldots, B_k)$ that also satisfies the size constraint (each $ib_j$ must satisfy $ib_j$=floor($B_j$) or $ib_j$=ceiling($B_j$).

EXAMPLE FOR m=3

The alternative embodiment of present invention may be better understood by referring to the sample code of Table G, also shown as 150 of FIG. 1, which comprises three nested loops, m=3. The block sizes of the sample code of Table G are to be optimized for execution on a machine having the machine dependent characteristics of Table B.

First, a function Compute_DL_DP( ) builds an Array Coefficients List (ACL) containing three array references: a(i,j), b(i,k), c(k,j) (note that a(i,j) is only included once). Function Compute_DL_DP( ) then computes polynomial expressions for DL and DP, as shown below and as shown in Table H (x_ is a vector of block sizes for the three loops, such that value[x,0], value[x,1], value[x,2] refer to the block size variables for loops j, i, and k respectively).

NEW DL[x_]:=((+0.062500*value[x,1]+0.937500)*(+1.000000*value[x,0])) +((+0.031250*value[x,2]+0.968750)*(+1.000000*value[x,1]))+((+0.031250*value[x,0]+0.968750)*(+1.000000*value[x,2]))

NEW DP[x_]:=(+0.781250*value[x,0]+0.001953*value[x,1]+0.216797)+(+0.390625*value[x,1]+0.000977*value[x,2]+0.608398)+(+0.000977*value[x,0]+0.390625*value[x,2]+0.608398)

The above polynomial expressions for DL and DP are obtained using the machine dependent parameters of Table B.

Based on the above DL and DP polynomials, function SelectLoopSort( ) returns the following permutation:

LoopSort[0]=0
LoopSort[1]=1
LoopSort[2]=2 recommending the existing following j-i-k loop ordering as the optimized loop configuration. In this example, the recommended loop permutation is performable; in general, data dependences may prevent such a permutation from being performed.

solving the m=2 case for $B_1$ and $B_2$ in each of the iterations although each iteration may be solved using only the alternative embodiment. Thus, still another embodiment of the present invention is a combination comprising both the above preferred embodiment and the above alternative embodiment.

TABLE G

Sample Code for m = 3 Case, Three Nested Loops

| | |
|---|---|
| 1] | parameter (n=400) |
| 2] | |
| 3] | real*4 b(n,n), c(n,n) |
| 4] | real*8 a(n,n) |
| 5] | |
| 6] | do j=1, n |
| 7] |   do i=1, n |
| 8] |     do k=1, n |
| 9] |       a(j,i) = a(j,i) + dble(b(i,k)) * dble(c(k,j)) |
| 10] |     end do |
| 11] |   end do |
| 12] | end do |
| 13] | |
| 14] | print*,a(1,1) |
| 15] | |
| 16] | end |

TABLE H

Polynomial Expressions for DL (Number of Distinct Cache Lines Accessed) and DP (Number of Distinct Virtual Pages Accessed) for Sample Code of Table G Compute_DL_DP: Bmax[0] = 400
Compute_DL_DP: Bmax[1] = 400
Compute_DL_DP: Bmax[2] = 400
NEW DL[x_] := ((+0.062500*value[x,1]+0.937500)*(1.000000*value[x,0])) +
((+0.031250*value[x,2]+0.968750)*(+1.000000*value[x,1])) +
((+0.031250*value[x,0]+0.968750)*(+1.000000*value[x,2]))
NEW DP[x_] := (+0.781250*value[x,0]+0.001953*value[x,1]+0.216797) +
(+0.390625*value[x,1]+0.000977*value[x,2]+0.608398) +
(+0.000977*value[x,0]+0.390625*value[x,2]+0.608398)
NEW cacheEfficiencyFactor = 1.000000 ; tlbEfficiencyFactor = 1.000000

The alternative embodiment then performs twelve iterations as shown in Table I through Table T of calculating new $B_i$ (new $B_0$ O in this example) until all $F_i$'s are greater than or equal to zero; after which, the best integer solution (Table P) in the neighborhood satisfying the constraints is selected to obtain the following optimized set of block size values:

Bout[0]=45
Bout[1]=48
Bout[2]=72
MemCost=0.075386 cycles per iteration indicating that the j, i, and k loops should have block sizes=45, 48, and 72 respectively, resulting in an estimated memory cost of under 0.075 cycles/iteration (when counting both cache and TLB misses) as shown in Table U. Note that this is a significant improvement over the memory cost of about 1.35 cycles per iteration that was obtained by blocking only the two inner loops.

Note that in this example, the alternative embodiment in solving the m=3 case uses the preferred embodiment for

TABLE I

First Iteration of Constants and Constraints of Objective Function to be Minimized and Resulting Nineteen Local Optimal Points for the m = 3 Case Sample Code of Table G CALLING Block2() for newB[0] = 2
double A = 15.238280
double B = 14.749089
double C = 0.196237
double D = 83.181754
double a1 = 1.118043
double b1 = 1.043397
double c1 = 0.031250
double k1 = 509.760601
double a2 = 0.392578
double b2 = 0.391602
double c2 = 0.000000
double k2 = 124.697908
double xlb = 1.000000
double xub = 400.000000

TABLE I-continued

First Iteration of Constants and Constraints of Objective Function to be Minimized and Resulting Nineteen Local Optimal Points for the m = 3 Case Sample Code of Table G

```
double ylb = 1.000000
double yub = 400.000000
double *xans = 95.788217
double *yans = 99.749154
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 1.000000)
Points[5] = (400.000000, 4.617993)
Points[6] = ((1.000000, 1.000000)
Points[7] = (6.785259, 400.000000)
Points[8] = (95.788217, 99.749154)
Points[9] = (1.000000, 1.000000)
Points[10] = (1.000000, 317.428074)
Points[11] = (1.000000, 1.000000)
Points[12] = (316.640940, 1.000000)
Points[13] = (1.000000, 1.000000)
Points[14] = (157.643115, 160.394328)
Points[15] = (1.000000, 1.000000)
Points[16] = (301.121031, 16.558612)
Points[17] = (18.817114, 299.566528)
Points[18] = (1.000000, 1.000000)
RETURNING FROM Block2()
```

TABLE J

Second Iteration of Constants and Constraints of Objective Function to be Minimized and Resulting Nineteen Local Optimal Points for the m = 3 Case Sample Code of Table G

```
CALLING Block2() for newB[0] = 4
double A = 7.946399
double B = 7.467631
double C = 0.096177
double D = 67.880895
double a1 = 1.273364
double b1 = 1.121057
double c1 = 0.031250
double k1 = 507.430788
double a2 = 0.392578
double b2 = 0.391602
double c2 = 0.000000
double k2 = 122.753970
double xlb = 1.000000
double xub = 400.000000
double ylb = 1.000000
double yub = 400.000000
double *xans = 91.184118
double *yans = 98.555400
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 1.000000)
Points[5] = (1.000000, 1.000000)
Points[6] = (388.091558, 1.000000)
Points[7] = (4.284208, 400.000000)
Points[8] = (91.184118, 98.555400)
Points[9] = (1.000000, 1.000000)
Points[10] = (1.000000, 312.464003)
Points[11] = (1.000000, 1.000000)
Points[12] = (311.689217, 1.000000)
Points[13] = (1.000000, 1.000000)
Points[14] = (154.075871, 159.006397)
Points[15] = (1.000000, 1.000000)
Points[16] = (300.908925, 11.807175)
Points[17] = (16.550268, 296.874957)
Points[18] = (1.000000, 1.000000)
RETURNING FROM Block2()
```

TABLE K

Third Iteration of Constants and Constraints of Objective Function to be Minimized and the Resulting Nineteen Local Optimal Points for the m = 3 Case Sample Code of Table G

```
CALLING Block2() for newB[0] = 10
double A = 4.301139
double B = 3.827581
double C = 0.046156
double D = 60.231893
double a1 = 1.603482
double b1 = 1.286116
double c1 = 0.031250
double k1 = 502.479018
double a2 = 0.392578
double b2 = 0.391602
double c2 = 0.000000
double k2 = 118.622337
double xlb = 1.000000
double xub = 400.000000
double ylb = 1.000000
double yub = 400.000000
double *xans = 82.632358
double *yans = 95.642043
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 380.209832)
Points[5] = (1.000000, 1.000000)
Points[6] = (306.590226, 1.000000)
Points[7] = (1.000000, 1.000000)
Points[8] = (82.632358, 95.642043)
Points[9] = (1.000000, 1.000000)
Points[10] = (1.000000, 301.913398)
Points[11] = (1.000000, 1.000000)
Points[12] = (301.164827, 1.000000)
Points[13] = (1.000000, 1.000000)
Points[14] = (146.972248, 155.577129)
Points[15] = (1.000000, 1.000000)
Points[16] = (300.185806, 1.981493)
Points[17] = (12.004638, 290.881317)
Points[18] = (1.000000, 1.000000)
RETURNING FROM Block2()
```

TABLE L

Fourth Iteration of Constants and Constraints of Objective Function to be Minimized and Resulting Nineteen Local Optimal Points for the m = 3 Case Sample Code of Table G

```
CALLING Block2() for newB[0] = 20
double A = 2.632312
double B = 2.161140
double C = 0.023256
double D = 56.730124
double a1 = 2.228482
double b1 = 1.598616
double c1 = 0.031250
double k1 = 493.104018
double a2 = 0.392578
double b2 = 0.391602
double c2 = 0.000000
double k2 = 110.800071
double xlb = 1.000000
double xub = 400.000000
double ylb = 1.000000
double yub = 400.000000
double *xans = 69.817591
double *yans = 89.280328
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 301.175380)
Points[5] = (1.000000, 1.000000)
Points[6] = (217.506044, 1.000000)
```

TABLE L-continued

Fourth Iteration of Constants and Constraints of Objective Function to be Minimized and Resulting Nineteen Local Optimal Points for the m = 3 Case Sample Code of Table G

```
Points[7] = (1.000000, 1.000000)
Points[8] = (69.817591, 89.280328)
Points[9] = (1.000000, 1.000000)
Points[10] = (1.000000, 281.938336)
Points[11] = (1.000000, 1.000000)
Points[12] = (281.239484, 1.000000)
Points[13] = (1.000000, 1.000000)
Points[14] = (134.786551, 147.818153)
Points[15] = (1.000000, 1.000000)
Points[16] = (1.000000, 1.000000)
Points[17] = (4.371558, 278.558370)
Points[18] = (1.000000, 1.000000)
RETURNING FROM Block2()
```

TABLE M

Fifth Iteration of Constants and Constraints of Objective Function to be Minimized and the Resulting Nineteen Local Optimal Points for the m = 3 Case Sample Code of Table G

```
CALLING Block2() for newB[0] = 30
double A = 2.070292
double B = 1.599923
double C = 0.015544
double D = 55.550813
double a1 = 2.853482
double b1 = 1.911116
double c1 = 0.031250
double k1 = 483.729018
double a2 = 0.392578
double b2 = 0.391602
double c2 = 0.000000
double k2 = 102.977805
double xlb = 1.000000
double xub = 400.000000
double ylb = 1.000000
double yub = 400.000000
double *xans = 60.013498
double *yans = 82.524349
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 247.572041)
Points[5] = (1.000000, 1.000000)
Points[6] = (167.023444, 1.000000)
Points[7] = (1.000000, 1.000000)
Points[8] = (60.013498, 82.524349)
Points[9] = (1.000000, 1.000000)
Points[10] = (1.000000, 261.963273)
Points[11] = (1.000000, 1.000000)
Points[12] = (261.314111, 1.000000)
Points[13] = (1.000000, 1.000000)
Points[14] = (123.667837, 138.989532)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE N

Sixth Iteration of Constants and Constraints of Objective Function to be Minimized and the Resulting Nineteen Local Optimal Pointsfor the m = 3 Case Sample Code of Table G

```
CALLING Block2() for newB[0] = 40
double A = 1.788192
double B = 1.318226
double C = 0.011673
```

TABLE N-continued

Sixth Iteration of Constants and Constraints of Objective Function to be Minimized and the Resulting Nineteen Local Optimal Pointsfor the m = 3 Case Sample Code of Table G

```
double D = 54.958871
double a1 = 3.478482
double b1 = 2.223616
double c1 = 0.031250
double k1 = 474.354018
double a2 = 0.392578
double b2 = 0.391602
double c2 = 0.000000
double k2 = 95.155540
double xlb = 1.000000
double xub = 400.000000
double ylb = 1.000000
double yub = 400.000000
double *xans = 52.246675
double *yans = 75.879215
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 208.826386)
Points[5] = (1.000000, 1.000000)
Points[6] = (134.520351, 1.000000)
Points[7] = (1.000000, 1.000000)
Points[8] = (52.246675, 75.879215)
Points[9] = (1.000000, 1.000000)
Points[10] = (1.000000, 241.988211)
Points[11] = (1.000000, 1.000000)
Points[12] = (241.388738, 1.000000)
Points[13] = (1.000000, 1.000000)
Points[14] = (113.222328, 129.486026)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE O

Seventh Iteration of Constants and Constraints of Objective Function to be Minimized and Resulting Nineteen Local Optimal Pointsfor the m = 3 Case Sample Code of Table G

```
CALLING Block2() for newB[0] = 50
double A = 1.618582
double B = 1.148859
double C = 0.009346
double D = 54.602971
double a1 = 4.103482
double b1 = 2.536116
double c1 = 0.031250
double k1 = 464.979018
double a2 = 0.392578
double b2 = 0.391602
double c2 = 0.000000
double k2 = 87.333274
double xlb = 1.000000
double xub = 400.000000
double ylb = 1.000000
double yub = 400.000000
double *xans = 45.943244
double *yans = 69.602896
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 179.512980)
Points[5] = (1.000000, 1.000000)
Points[6] = (111.843496, 1.000000)
Points[7] = (1.000000, 1.000000)
Points[8] = (45.943244, 69.602896)
Points[9] = (1.000000, 1.000000)
Points[10] = (1.000000, 222.013149)
```

TABLE O-continued

Seventh Iteration of Constants and Constraints of Objective Function to be Minimized and Resulting Nineteen Local Optimal Pointsfor the m = 3 Case Sample Code of Table G

```
Points[11] = (1.000000, 1.000000)
Points[12] = (221.463365, 1.000000)
Points[13] = (1.000000, 1.000000)
Points[14] = (103.227616, 119.530601)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE P

Eighth Iteration of Constants and Constraints of Objective Function to be Minimized and Resulting Nineteen Local Optimal Pointsfor the m = 3 Case Sample Code of Table G

```
CALLING Block2() for newB[0] = 45
double A = 1.693997
double B = 1.224166
double C = 0.010381
double D = 54.761217
double a1 = 3.790982
double b1 = 2.379866
double c1 = 0.031250
double k1 = 469.666518
double a2 = 0.392578
double b2 = 0.391602
double c2 = 0.000000
double k2 = 91.244407
double xlb = 1.000000
double xub = 400.000000
double ylb = 1.000000
double yub = 400.000000
double *xans = 48.938536
double *yans = 72.685393
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 193.219870)
Points[5] = (1.000000, 1.000000)
Points[6] = (122.254911, 1.000000)
Points[7] = (1.000000, 1.000000)
Points[8] = (48.938536, 72.685393)
Points[9] = (1.000000, 1.000000)
Points[10] = (1.000000, 232.000680)
Points[11] = (1.000000, 1.000000)
Points[12] = (231.426051, 1.000000)
Points[13] = (1.000000, 1.000000)
Points[14] = (108.178558, 124.554844)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE Q

Ninth Iteration of Constants and Constraints of Objective Function to be Minimized and Resulting Nineteen Local Optimal Pointsfor the m = 3 Case Sample Code of Table G

```
CALLING Block2() for newB[0] = 55
double A = 1.556840
double B = 1.087205
double C = 0.008499
double D = 54.473416
double a1 = 4.415982
double b1 = 2.692366
double c1 = 0.031250
```

TABLE Q-continued

Ninth Iteration of Constants and Constraints of Objective Function to be Minimized and Resulting Nineteen Local Optimal Pointsfor the m = 3 Case Sample Code of Table G

```
double k1 = 460.291518
double a2 = 0.392578
double b2 = 0.391602
double c2 = 0.000000
double k2 = 83.422141
double xlb = 1.000000
double xub = 400.000000
double ylb = 1.000000
double yub = 400.000000
double *xans = 43.219937
double *yans = 66.642041
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 167.378780)
Points[5] = (1.000000, 1.000000)
Points[6] = (102.895269, 1.000000)
Points[7] = (1.000000, 1.000000)
Points[8] = (43.219937, 66.642041)
Points[9] = (1.000000, 1.000000)
Points[10] = (1.000000, 212.025618)
Points[11] = (1.000000, 1.000000)
Points[12] = (211.500678, 1.000000)
Points[13] = (1.000000, 1.000000)
Points[14] = (98.354666, 114.428172)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE R

Tenth Iteration of Constants and Constraints of Objective Function to be Minimized and Resulting Nineteen Local Optimal Points for the m = 3 Case Sample Code of Table G

```
CALLING Block2() for newB[0] = 50
double A = 1.618582
double B = 1.148859
double C = 0.009346
double D = 54.602971
double a1 = 4.103482
double b1 = 2.536116
double c1 = 0.031250
double k1 = 464.979018
double a2 = 0.392578
double b2 = 0.391602
double c2 = 0.000000
double k2 = 87.333274
double xlb = 1.000000
double xub = 400.000000
double ylb = 1.000000
double yub = 400.000000
double *xans = 45.943244
double *yans = 69.602896
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 179.512980)
Points[5] = (1.000000, 1.000000)
Points[6] = (111.843496, 1.000000)
Points[7] = (1.000000, 1.000000)
Points[8] = (45.943244, 69.602896)
Points[9] = (1.000000, 1.000000)
Points[10] = (1.000000, 222.013149)
Points[11] = (1.000000, 1.000000)
Points[12] = (221.463365, 1.000000)
Points[13] = (1.000000, 1.000000)
Points[14] = (103.227616, 119.530601)
```

TABLE R-continued

Tenth Iteration of Constants and Constraints of Objective Function to be Minimized and Resulting Nineteen Local Optimal Points for the m = 3 Case Sample Code of Table G

```
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE S

Eleventh Iteration of Constants and Constraints of Objective Function to be Minimized and Resulting Nineteen Local Optimal Pointsfor the m = 3 Case Sample Code of Table G

```
CALLING Block2() for newB[0] = 47
double A = 1.654311
double B = 1.184537
double C = 0.009836
double D = 54.677943
double a1 = 3.947232
double b1 = 2.457991
double c1 = 0.031250
double k1 = 467.322768
double a2 = 0.392578
double b2 = 0.391602
double c2 = 0.000000
double k2 = 89.288840
double xlb = 1.000000
double xub = 400.000000
double ylb = 1.000000
double yub = 400.000000
double *xans = 47.404523
double *yans = 71.129451
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 186.151329)
Points[5] = (1.000000, 1.000000)
Points[6] = (116.844756, 1.000000)
Points[7] = (1.000000, 1.000000)
Points[8] = (47.404523, 71.129451)
Points[9] = (1.000000, 1.000000)
Points[10] = (1.000000, 227.006914)
Points[11] = (1.000000, 1.000000)
Points[12] = (226.444708, 1.000000)
Points[13] = (1.000000, 1.000000)
Points[14] = (105.692486, 122.053350)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE T

Twelveth Iteration of Constants and Constraints of Objective Function to be Minimized and Resulting Nineteen Local Optimal Pointsfor the m = 3 Case Sample Code of Table G

```
CALLING Block2() for newB[0] = 46
double A = 1.673620
double B = 1.203817
double C = 0.010101
double D = 54.718459
double a1 = 3.869107
double b1 = 2.418929
double c1 = 0.031250
double k1 = 468.494643
double a2 = 0.392578
double b2 = 0.391602
double c2 = 0.000000
```

TABLE T-continued

Twelveth Iteration of Constants and Constraints of Objective Function to be Minimized and Resulting Nineteen Local Optimal Pointsfor the m = 3 Case Sample Code of Table G

```
double k2 = 90.266624
double xlb = 1.000000
double xub = 400.000000
double ylb = 1.000000
double yub = 400.000000
double *xans = 48.162117
double *yans = 71.903830
Points[0] = (1.000000, 1.000000)
Points[1] = (1.000000, 400.000000)
Points[2] = (400.000000, 1.000000)
Points[3] = (400.000000, 400.000000)
Points[4] = (1.000000, 189.629254)
Points[5] = (1.000000, 1.000000)
Points[6] = (119.495650, 1.000000)
Points[7] = (1.000000, 1.000000)
Points[8] = (48.162117, 71.903830)
Points[9] = (1.000000, 1.000000)
Points[10] = (1.000000, 229.503797)
Points[11] = (1.000000, 1.000000)
Points[12] = (228.935380, 1.000000)
Points[13] = (1.000000, 1.000000)
Points[14] = (106.932755, 123.306870)
Points[15] = (1.000000, 1.000000)
Points[16] = (1.000000, 1.000000)
Points[17] = (1.000000, 1.000000)
Points[18] = (1.000000, 1.000000)
RETURNING FROM Block2()
```

TABLE U

Block Sizes and Memory Cost for the m=3 Case Sample Code of Table G

```
AT END OF SelectBlockSizes() which calls Block2() . . .
Call to EstimateMemCostOfPermutation:
    LoopSort[0] = 0
    LoopSort[1] = 1
    LoopSort[2] = 2
    MemCost = 35.548676 cycles per iteration
    localityGroupSize = 0
Call to EstimateMemCostOfPermutation:
    LoopSort[0] = 0
    LoopSort[1] = 1
    LoopSort[2] = 2
    MemCost = 35.548676 cycles per iteration
    localityGroupSize = 0
SelectBlockSizes() -- Loop permutation is unnecessary:
    act_MemCost = 35.548676 cycles per iteration
    p_MemCost = 35.548676 cycles per iteration
OUTPUT FROM call to SelectBlockSizes:
Bout[0] = 45
Bout[1] = 48
Bout[2] = 72
MemCost = 0.075386 cycles per iteration
```

Referring next to FIG. 4 through FIG. 9, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill in the art to write code in any suitable computer programming language.

Figure 4:
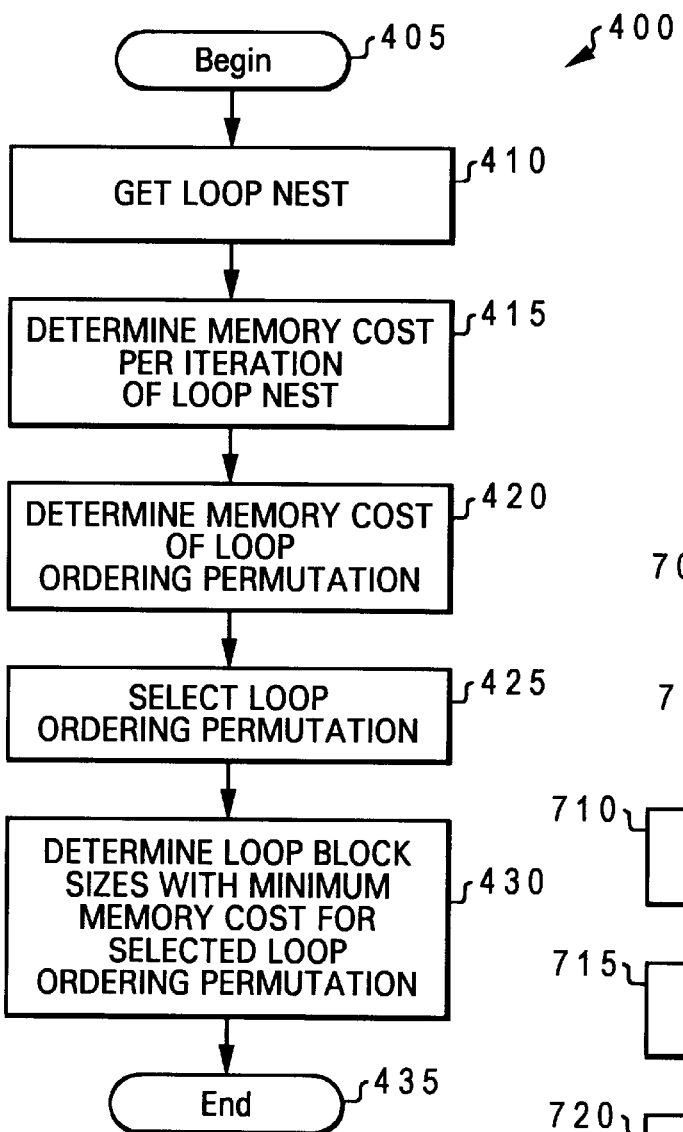
FIG. 4, FIG. 5, FIG. 6, FIG. 7, FIG. 8, and FIG. 9 are flowcharts illustrating the operations preferred in carrying out the practice of the present invention.

Referring next to FIG. 4, the process of the present invention, generally referred to as 400, begins at process block 405. Thereafter, process block 410 gets a loop nest, and process block 415 determines a memory cost per iteration of the loop nest. Thereafter, process block 420 determines memory costs of loop ordering permutations, and process block 425 selects one of the loop ordering permutations. Thereafter, process block 430 determines loop block sizes with minimum memory cost for the selected loop ordering permutation. Thereafter, the process ends at process block 435.

Figure 5:
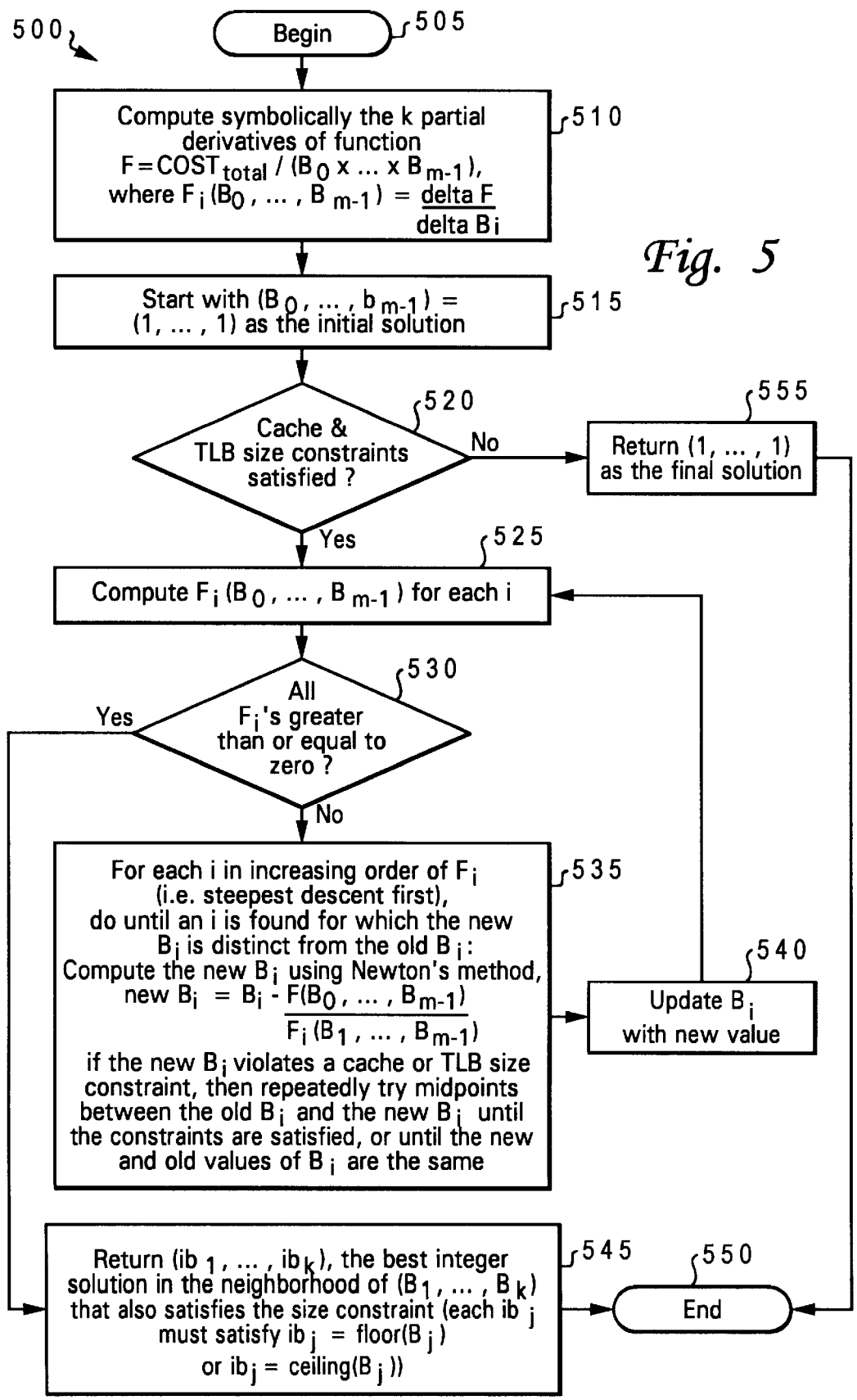

Referring next to FIG. 5, the process of the alternative embodiment, generally referred to as 500, is an expansion of process block 430. This process begins at process block 505, and then process block 510 computes symbolically k partial derivatives of a function $F=COST_{total}/(B_0 x \ldots x B_{m-1})$ where $F_i(B_0, \ldots, B_{m-1})$=delta F/delta $B_i$. Thereafter, process block 515 starts with $(B_0, \ldots, B_{m-1})$=$(1, \ldots, 1)$ as an initial solution, and then decision block 520 determines if cache and TLB size constraints are satisfied by this initial solution. If cache and TLB size constraints are satisfied by this initial solution, then process block 525 computes $F_i(B_0, \ldots, B_{m-1})$ for each i, and decision block 530 determines if all $F_i$'s are greater than or equal to zero. If all $F_i$'s are not greater than or equal to zero, then process block 535 attempts to find a value of i for which a new $B_i$ is distinct from the old $B_i$. Process block 535 performs this in a do until loop for each i in increasing order of $F_i$ (i.e. steepest descent first) until an i is found for which the new $B_i$ is distinct from the old $B_i$. The new $B_i$ is computed using Newton's method in which new $B_i=B_i-[F(B_0, \ldots, B_{m-1})]/[F_i(B_1, \ldots, B_{m-1})]$. If a new $B_i$ violates a cache or TLB size constraint, then process block 535 repeatedly tries midpoints between the old $B_i$ and the new $B_i$ until the cache and TLB size constraints are satisfied, or until the new $B_i$ and the old $B_i$ values are the same. Once process block 535 determines a value for the new $B_i$, then process block 540 updates $B_i$ with the new value, and then the process loops back to process block 525 to compute $F_i(B_0, \ldots, B_{m-1})$ for each i.

Returning now to decision block 530, if all $F_i$'s are greater than or equal to zero, then process block 545 returns ($ib_1$, . . . , $ib_k$), the best integer solution in the neighborhood of ($B_1$, . . . , $B_k$) that also satisfies the size constraints (each ibj must satisfy ibj=floor($B_j$) or ibj=ceiling($B_j$)). Thereafter, the process ends at process block 550.

Returning now to decision block 520, if the cache and TLB size constraints are not satisfied by the initial solution, then process block 555 returns (1, . . . , 1) as the final solution.

Figure 6:
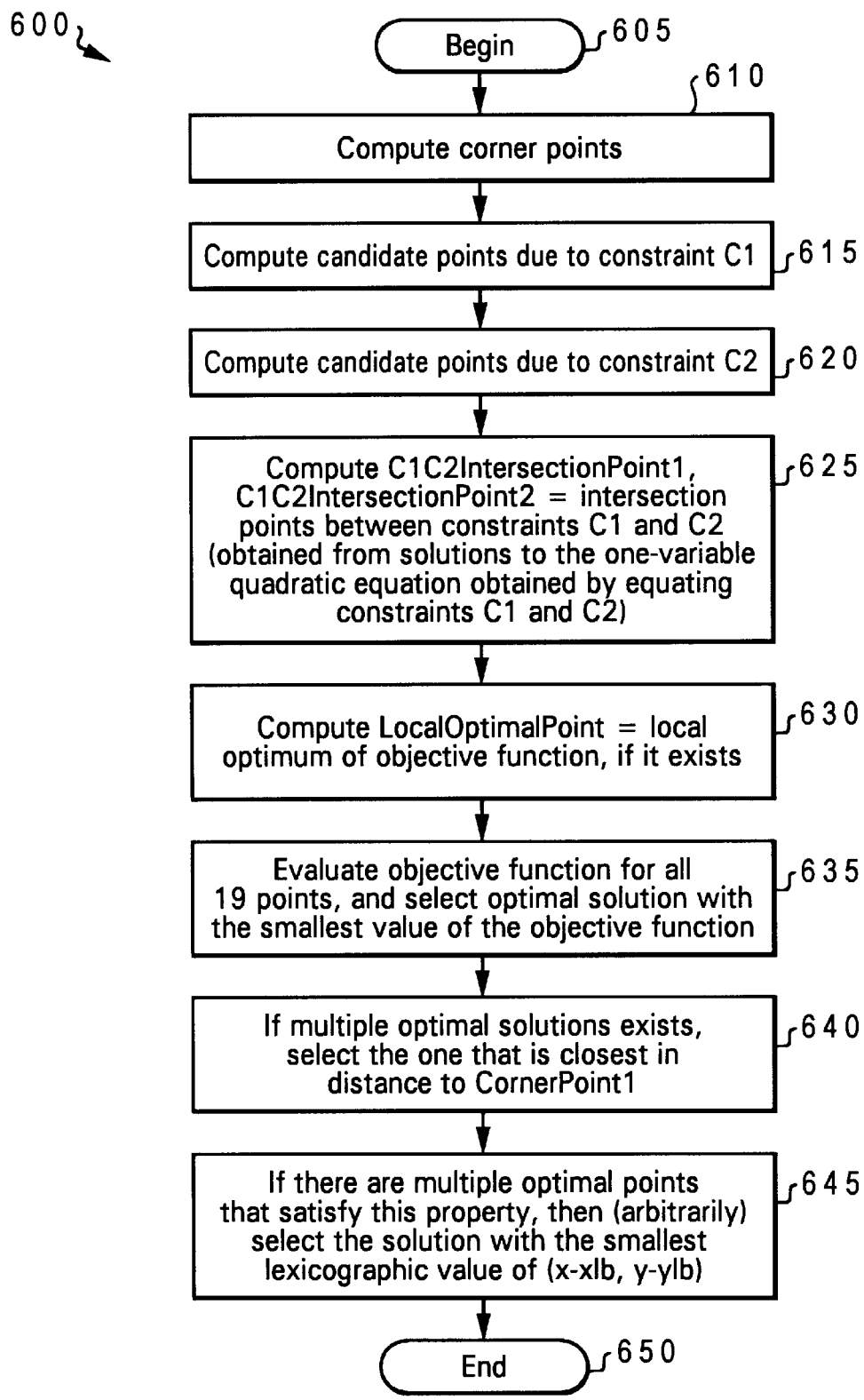

Referring next to FIG. 6 through FIG. 9, the operations of the preferred embodiment in the practice of process block 430 are illustrated. Referring first to FIG. 6, the process, generally referred to as 600, begins at process block 605, and then process block 610 computes corner points (210, 220, 230, and 240). Thereafter, process block 615 computes candidate points due to constraint C1 310, and process block 620 computes candidate points due to constraint C2 390. Process block 625 then computes two intersection points between constraint C1 310 and constraint C2 390, these two intersection points being known as C1C2IntersectionPoint1 375 and C1C2IntersectionPoint2 380, and being obtained from solutions to a one-variable quadratic equation obtained by equating constraints C1 310 and C2 390. Thereafter, process block 630 computes a local optimum of an objective function, LocalOptimalPoint 385, if it exists. Process block 635 then evaluates the objective function for the nineteen candidate points, and selects one of the candidate points with a smallest value of the objective function as an optimal solution. Responsive to process block 635, process block 640 determines if multiple optimal solutions exists, and if so, selects the one that is closest in distance to ComerPoint1 210. Responsive to process block 640, process block 645 determines if there are multiple optimal points satisfying the process block 640 selection criteria, and if so, then arbitrarily selects a solution with the smallest lexicographic value of (x−xlb,y−ylb). Thereafter, the process ends at process block 650.

Figure 7:
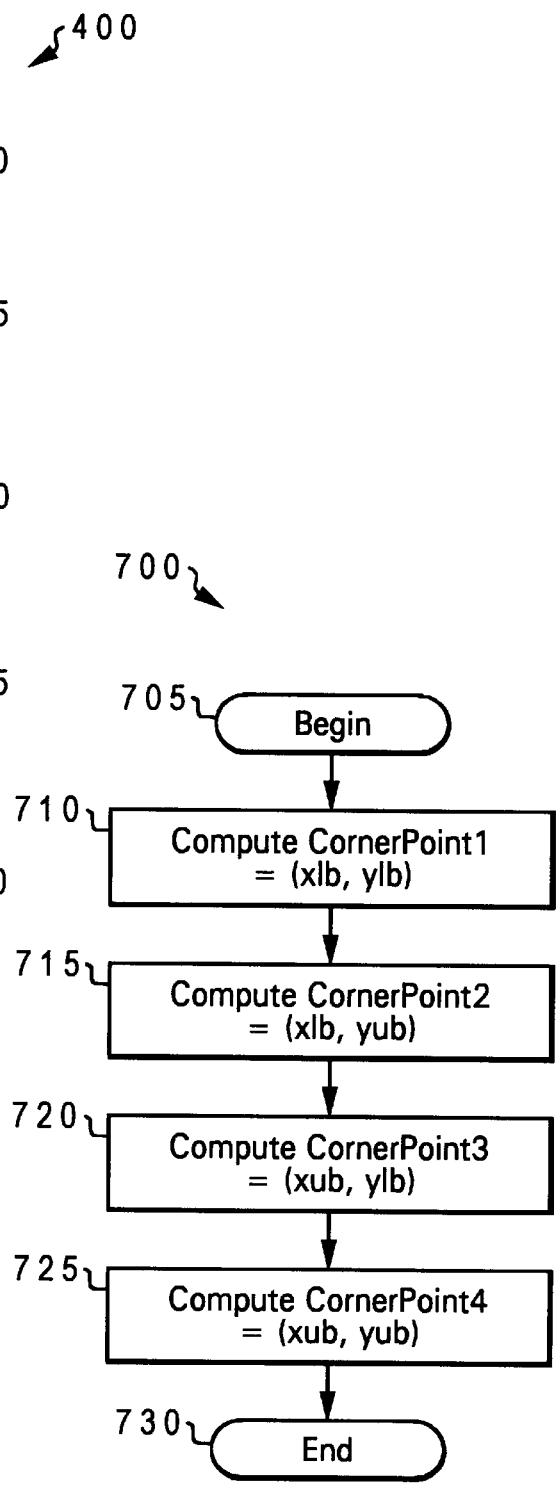

Referring next to FIG. 7, the process, generally referred to as 700, is an expansion of process block 610. This process begins at process block 705, after which, process block 710 computes ComerPoint1 210=(xlb,ylb); process block 715 computes ComerPoint2 220=(xlb,yub); process block 720 computes ComerPoint3 230=(xub,ylb); and process block 725 computes ComerPoint4 240=(xub,yub). Thereafter, the process ends at process block 730.

Figure 8:
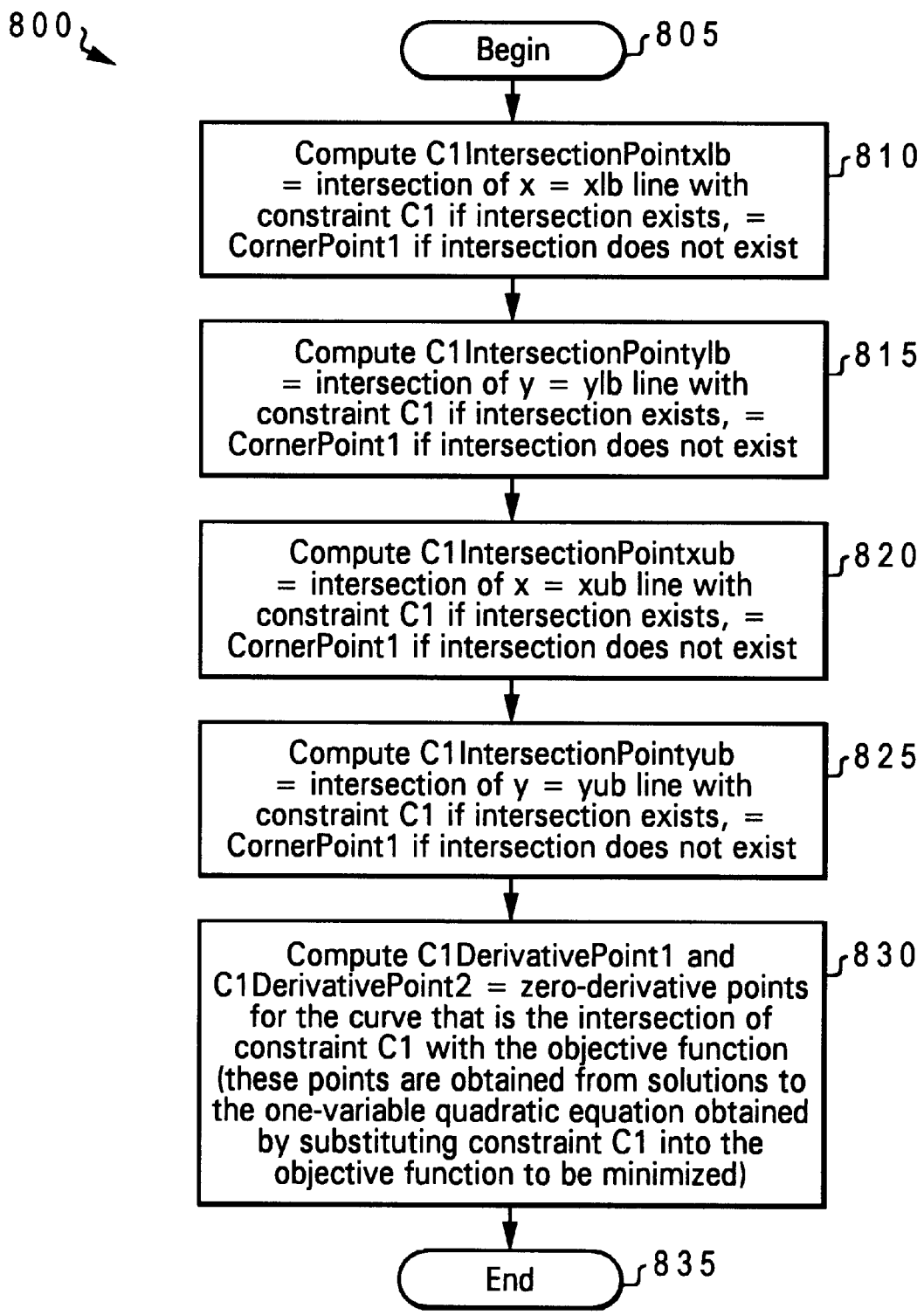

Referring next to FIG. 8, the process, generally referred to as 800, is an expansion of process block 615. This process begins at process block 805. Thereafter, process block 810 computes C1IntersectionPointxlb 315, an intersection of an x=xlb line with constraint C1 310 if the intersection exists, otherwise process block 810 sets C1IntersectionPointxlb 315 equal to CornerPoint1 210 if the intersection does not exist. Process block 815 computes C1IntersectionPointylb 320, an intersection of a y=ylb line with constraint C1 310 if the intersection exists, otherwise process block 815 sets C1IntersectionPointylb 320 equal to CornerPoint1 210 if the intersection does not exist. Process block 820 computes C1IntersectionPointxub 325, an intersection of an x=xub line with constraint C1 310 if the intersection exists, otherwise process block 820 sets C1IntersectionPointxub 325 equal to ComerPoint1 210 if the intersection does not exist. Process block 825 computes C1IntersectionPointyub 330, an intersection of a y=yub line with constraint C1 210 if the intersection exists, otherwise process block 825 sets C1IntersectionPointyub 330 equal to CornerPoint1 210 if the intersection does not exist. Thereafter, process block 830 computes C1DerivativePoint1 335 and C1DerivativePoint2 340, two zero-derivative points for a curve that is an intersection of constraint C1 210 with the objective function. These two zero-derivative points (335 and 340) are obtained from solutions to the one-variable quadratic equation obtained by substituting constraint C1 210 into the objective function to be minimized. Thereafter, the process ends at process block 835.

Figure 9:
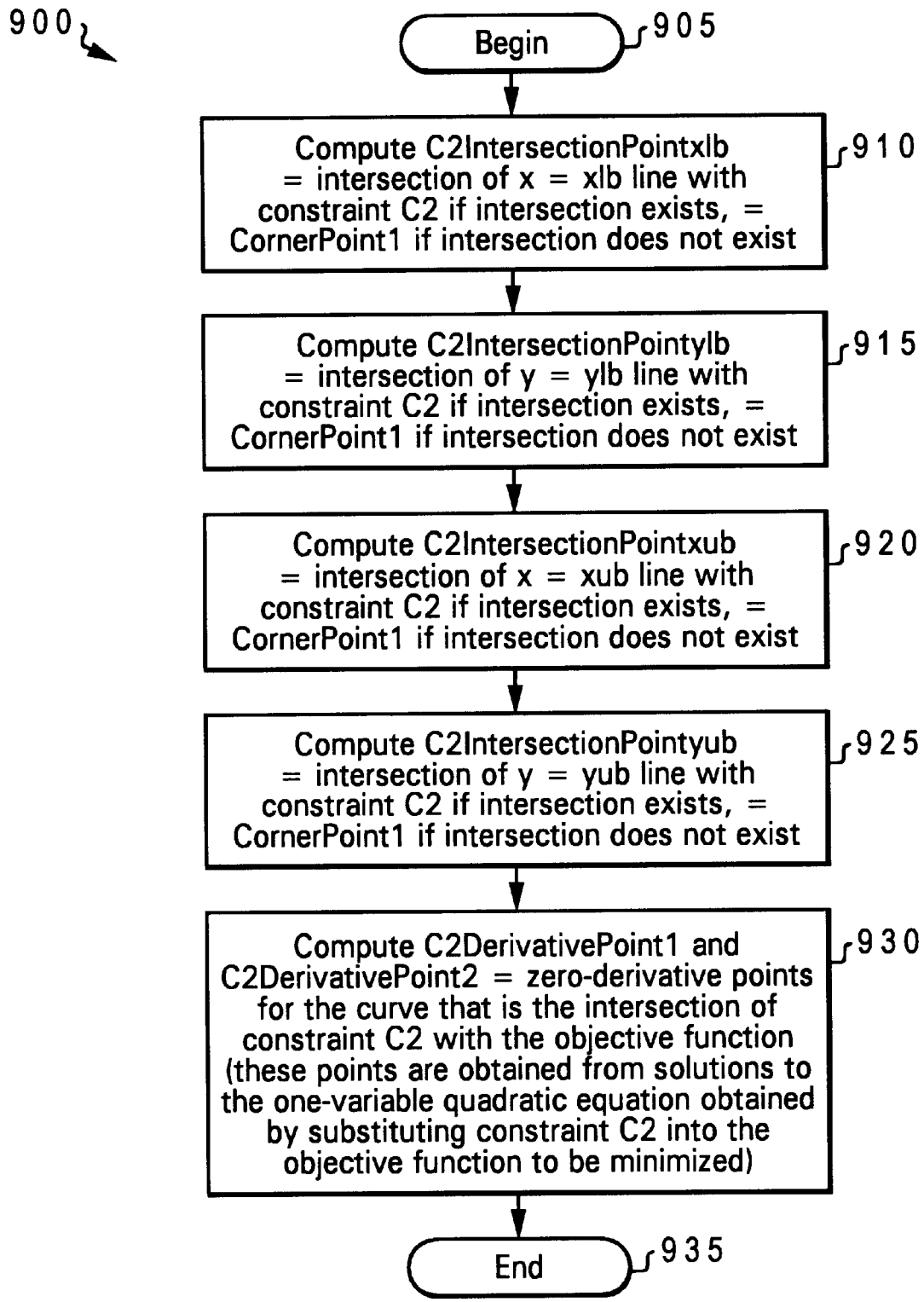

Referring next to FIG. 9, the process, generally referred to as 900, is an expansion of process block 625. The process begins at process block 905. Thereafter, process block 910 computes C2IntersectionPointxlb 345, an intersection of an x=xlb line with constraint C2 390 if the intersection exists, otherwise process block 910 sets C2IntersectionPointxlb 345 equal to CornerPoint1 210 if the intersection does not exist. Process block 915 computes C2IntersectionPointylb 350, an intersection of a y=ylb line with constraint C2 390 if the intersection exists, otherwise process block 915 sets C2IntersectionPointylb 350 equal to CornerPoint1 210 if the intersection does not exist. Process block 920 computes C2IntersectionPointxub 355, an intersection of an x=xub line with constraint C2 390 if the intersection exists, otherwise process block 920 sets C2IntersectionPointxub 355 equal to CornerPoint1 210 if the intersection does not exist. Process block 925 computes C2IntersectionPointyub 360, an intersection of a y=yub line with constraint C2 390 if the intersection exists, otherwise process block 925 sets C2IntersectionPointyub 360 equal to CornerPoint1 210 if the intersection does not exist. Thereafter, process block 930 computes C2DerivativePoint1 365 and C2DerivativePoint2 370, two zero-derivative points for a curve that is an intersection of constraint C2 390 with the objective function. These zero-derivative points (365 and 370) are obtained from solutions to the one-variable quadratic equation obtained by substituting constraint C2 390 into the objective function to be minimized. Thereafter, the process ends at process block 935.

Estimating the Memory Cost

The number of distinct lines DL(i,LoopSet) accessed by the dimensions 1 ... i of the array reference may be defined by the following recurrence (for more details, see "On Estimating and Enhancing Cache Effectiveness", by Jeanne Ferrante, Vivek Sarkar, Wendy Thrash in Proceedings of the Fourth Workshop on Languages and Compilers for Parallel Computing, to be published by Springer-Verlag; an early version of this paper is available as IBM Research Report RC 17247 (#74481)):

```
i = 1 case:
DL(1, LoopSet)  = min(number of distinct references, 1 +(memory range of accesses)/L)
                      RANGE(C[0]₀', LoopSet)          MEMRANGE(1, LoopSet)
                = min(1 + GCD(c[0]₀', ... , c[0]ₘ₋₁'), 1 +        L          )
i > 1 case:
DL(i, LoopSet) =
                      RANGE(C[i]', LoopSet)           MEMRANGE(i, LoopSet)
    min((1 + GCD(c[i]₀', ... , c[i]ₘ₋₁')) * DL(i-1, LoopSet), 1 +    L       )
```

The problem with using the above definition for DL(i, LoopSet) at compile-time is that the value of the RANGE and MEMRANGE functions, and hence the min function, depends on the values of the block sizes, $B_i$. However, as the $B_i$ values are not known at compile time, a determination of which argument of the min function will be smaller cannot be made at compile time. A good approximation may be obtained by comparing 1/GCD( ... ) with DimStride[i]/L to decide which way the min function should go; choose the first (RANGE) term if 1/GCD( ... ) is smaller, otherwise choose the second (MEMRANGE) term. Note that this approach selects the 1/GCD( ... ) term whenever DimStride [i]>L, which is consistent with the observation that there is no spatial locality in dimension i. This approach defines an algorithm for resolving the min function at compile-time, and thus building a symbolic expression for DL(k-1, LoopSet), the number of distinct lines accessed by the entire reference. The symbolic expression is a product of at most k linear polynomials in the $B_i$ variables.

The previous paragraphs show how to estimate the number of distinct lines accessed by a single array reference, DL(k-1, LoopSet). To obtain the total number of (distinct) lines accessed by one iteration of the entire loop nest, the individual DL(k-1,LoopSet) expressions are computed and then linked together as operands of a POLYNOMIAL_SUM node. This sum of DL terms is denoted by $DL_{total}$.

One important subtlety in computing $DL_{total}$ is that of considering overlap between two references to the same array, and trying to avoid counting the overlap twice when adding the DL contributions of the individual array references. The heuristic used in function Compute_DL_DPO( ) is a simple one: assume 100% overlap among array references that are equivalent according to functions SubscriptTablesAreEquivalent, and zero overlap otherwise.

After computing the number of distinct lines $DL_{total}$, and the number of distinct pages $DP_{total}$, the total memory cost for the iteration block is estimated as follows:

```
COSTtotal = (overhead for fetching a new line in cache) * DLtotal +
            (overhead for fetching a new page in TLB) * DPtotal
```

Finally, the objective is to minimize the memory cost per iteration which is defined by the ratio $COST_{total}/(B_0^* \ldots ^* B_{m-1})$.

System and Article of Manufacture

Figure 10:
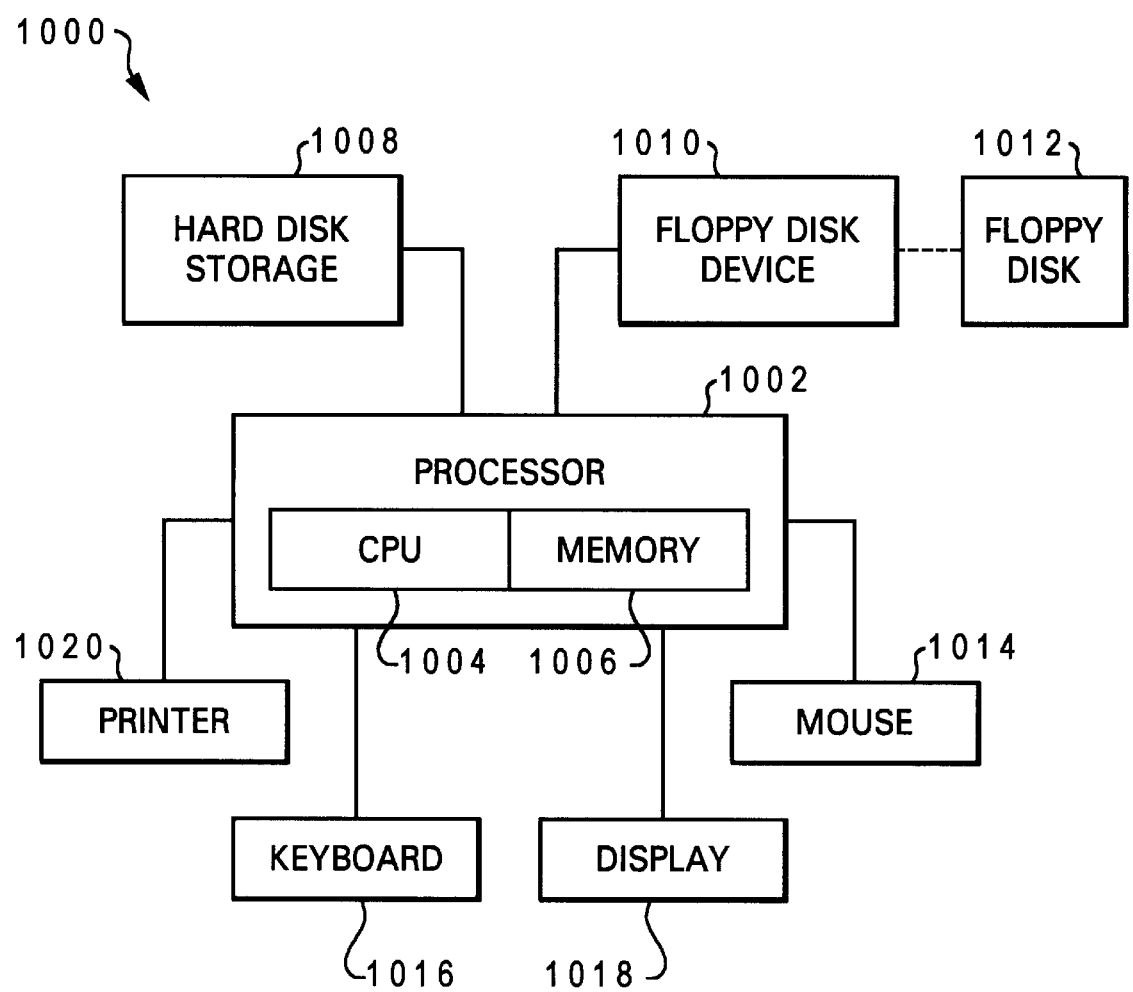
FIG. 10 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 10, a block diagram illustrates a computer system 1000 used in performing the method of the present invention, forming part of the apparatus of the present invention, and which may use the article of manufacture comprising a computer-readable storage medium having a computer program embodied in said medium which may cause the computer system to practice the present invention. The computer system 1000 includes a processor 1002, which includes a central processing unit (CPU) 1004, and a memory 1006. Additional memory, in the form of a hard disk file storage 1008 and a computer-readable storage device 1010, is connected to the processor 1002. Computer-readable storage device 1010 receives a computer-readable storage medium 1012 having a computer program embodied in said medium which may cause the computer system to implement the present invention in the computer system 1000. The computer system 1000 includes user interface hardware, including a mouse 1014 and a keyboard 1016 for allowing user input to the processor 1002 and a display 1018 for presenting visual data to the user. The computer system may also include a printer 1020.

Although the present invention has been particularly shown and described with reference to a preferred embodiment, it will be understood by those skilled in the art that various changes in form and detail may be made without departing from the spirit and the scope of the invention.

We claim:

1. A method of optimizing an execution time of a plurality of nested program loops, each of the plurality of nested program loops having an associated block size, said method comprising the steps of:

estimating a memory cost per iteration as a ratio of an estimated memory cost over a product of the block sizes, said estimated memory cost being estimated as proportional to a sum of two products, a first product of an estimated overhead for fetching a new line in cache and an estimated number of cache lines accessed, and a second product of an estimated overhead for fetching a new page in a translation look-aside buffer and an estimated number of pages accessed;

computing candidate points subject to a plurality of constraints at which the estimated memory cost is computed;

selecting one of the candidate points as a minimum memory cost per iteration; and selecting a set of block sizes that yields the minimum memory cost per iteration subject to the plurality of constraints.

2. The method of claim 1 wherein the candidate points are a set comprising:
   corner points of an iteration space;
   intersections between the constraints and edges of the iteration space;
   zero-derivative points for a curve that is an intersection of the constraints with the estimated memory cost;
   intersection points between the constraints; and
   a local optimum of the estimated memory cost.

3. The method of claim 1 wherein the selecting of the set of block sizes further comprises evaluating partial derivatives of the estimated memory cost.

4. The method of claim 3 further comprising the step of selecting a minimum memory cost per iteration by iteratively searching an iteration space and evaluating partial derivatives of the estimated memory cost.

5. The method of claim 4 further comprising the steps of:
   computing candidate points subject to a plurality of constraints at which the estimated memory cost is computed; and
   selecting one of the candidate points as a minimum memory cost per iteration.

6. An article of manufacture for use in a computer system for optimizing an execution time of a plurality of nested program loops, each of the plurality of nested program loops having an associated block size, said article of manufacture comprising a computer-readable storage medium having a computer program embodied in said medium which may cause the computer system to:
   estimate a memory cost per iteration as a ratio of an estimated memory cost over a product of the block sizes, said estimated memory cost being estimated as proportional to a sum of two products, a first product of an estimated overhead for fetching a new line in cache and an estimated number of cache lines accessed, and a second product of an estimated overhead for fetching a new page in a translation look-aside buffer and an estimated number of pages accessed;
   compute candidate points subject to a plurality of constraints at which the estimated memory cost is computed;
   select one of the candidate points as a minimum memory cost per iteration; and
   select a set of block sizes that yields the minimum memory cost per iteration subject to the plurality of constraints.

7. The article of manufacture of claim 6 wherein the candidate points are a set comprising:
   corner points of an iteration space;
   intersections between the constraints and edges of the iteration space;
   zero-derivative points for a curve that is an intersection of the constraints with the estimated memory cost;
   intersection points between the constraints; and
   a local optimum of the estimated memory cost.

8. The article of manufacture of claim 6 wherein the computer program in causing the computer to select the set of block sizes further causes the computer to evaluate partial derivatives of the estimated memory cost.

9. The article of manufacture of claim 8 wherein the computer program further causes the computer to select a minimum memory cost per iteration by iteratively searching an iteration space and evaluating partial derivatives of the estimated memory cost.

10. The article of manufacture of claim 9 wherein the computer program further causes the computer to:
    compute candidate points subject to a plurality of constraints at which the estimated memory cost is computed; and
    select one of the candidate points as a minimum memory cost per iteration.

11. A computer system for optimizing an execution time of a plurality of nested program loops, each of the plurality of nested program loops having an associated block size, said computer system comprising:
    an estimation of a memory cost per iteration as a ratio of an estimated memory cost over a product of the block sizes, said estimated memory cost being estimated as proportional to a sum of two products, a first product of an estimated overhead for fetching a new line in cache and an estimated number of cache lines accessed, and a second product of an estimated overhead for fetching a new page in a translation lookaside buffer and an estimated number of pages accessed;
    a compution of candidate points subject to a plurality of constraints at which the estimated memory cost is computed;
    a selection of one of the candidate points as a minimum memory cost per iterations; and
    a selection of a set of block sizes that yields the minimum memory cost per iteration subject to the plurality of constraints.

12. The computer system of claim 11 wherein the candidate points are a set comprising:
    comer points of an iteration space;
    intersections between the constraints and edges of the iteration space;
    zero-derivative points for a curve that is an intersection of the constraints with the estimated memory cost;
    intersection points between the constraints; and
    a local optimum of the estimated memory cost.

13. The computer system of claim 11 wherein the selection of the set of block sizes further comprises an evaluation of partial derivatives of the estimated memory cost.

14. The computer system of claim 13 further comprising a selection of a minimum memory cost per iteration by an iterative search of an iteration space and an evaluation of partial derivatives of the estimated memory cost.

15. The computer system of claim 14 further comprising:
    a compution of candidate points subject to a plurality of constraints at which the estimated memory cost is computed; and
    a selection of one of the candidate points as a minimum memory cost per iteration.

* * * * *

UNITED STATES PATENT AND TRADEMARK OFFICE
CERTIFICATE OF CORRECTION

PATENT NO. : 5,953,531
DATED : September 14, 1999
INVENTOR(S) : Nimrod Megiddo and Vivek Sarkar It is certified that error appears in the above-identified patent and that said Letters Patent is hereby corrected as shown below:

Column 27,
Line 49, please delete "comer" and insert -- corner --

Column 28,
Line 38, please delete "comer" and insert -- corner --

Signed and Sealed this

Eighth Day of January, 2002

Attest:

JAMES E. ROGAN
*Attesting Officer*     *Director of the United States Patent and Trademark Office*